(12) United States Patent
Takimoto et al.

(10) Patent No.: US 10,768,710 B2
(45) Date of Patent: Sep. 8, 2020

(54) INFORMATION PROCESSING DEVICE, INFORMATION PROCESSING METHOD, AND PROGRAM

(71) Applicant: SONY CORPORATION, Tokyo (JP)

(72) Inventors: Yuuji Takimoto, Kanagawa (JP); Yusuke Sakai, Kanagawa (JP); Masayuki Yamada, Tokyo (JP); Takeshi Ohashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 111 days.

(21) Appl. No.: 15/326,802

(22) PCT Filed: Aug. 31, 2015

(86) PCT No.: PCT/JP2015/004426
§ 371 (c)(1),
(2) Date: Jan. 17, 2017

(87) PCT Pub. No.: WO2016/035322
PCT Pub. Date: Mar. 10, 2016

(65) Prior Publication Data
US 2017/0205890 A1    Jul. 20, 2017

(30) Foreign Application Priority Data
Sep. 2, 2014   (JP) .................. 2014-178591

(51) Int. Cl.
*G06F 3/01*    (2006.01)
*G06F 3/0481*    (2013.01)
(Continued)

(52) U.S. Cl.
CPC ............ *G06F 3/017* (2013.01); *G06F 3/0304* (2013.01); *G06F 3/0485* (2013.01);
(Continued)

(58) Field of Classification Search
CPC ........ G06F 3/017; G06F 3/038; G06F 3/0304; G06F 3/04815; G06F 3/0485;
(Continued)

(56) References Cited

U.S. PATENT DOCUMENTS

2011/0154249 A1    6/2011   Jang et al.
2011/0267260 A1*   11/2011  Jang ....................... G03B 21/00
                                                   345/156
(Continued)

FOREIGN PATENT DOCUMENTS

CN    103428548 A    12/2013
CN    103677248 A    3/2014
(Continued)

OTHER PUBLICATIONS

Aug. 29, 2017, JP communication issued for related JP application No. 2014-178591.
(Continued)

*Primary Examiner* — Jimmy H Nguyen
(74) *Attorney, Agent, or Firm* — Paratus Law Group, PLLC

(57) ABSTRACT

There is provided an information processing device including an acquisition unit configured to acquire manipulation position information representing a manipulation position that is specified based on a manipulation for pointing to an outside of a display region that is a region in which a display object is displayable or an outside of a partial region of the display region associated with a user using a manipulating body at a position distant from the display region, and a control unit configured to control display of the display region based on the manipulation position information acquired by the acquisition unit.

24 Claims, 22 Drawing Sheets

(51) Int. Cl.
*G06F 3/0485* (2013.01)
*G06F 3/03* (2006.01)
*G06F 3/16* (2006.01)
*G09G 5/34* (2006.01)

(52) U.S. Cl.
CPC ...... *G06F 3/04812* (2013.01); *G06F 3/04815* (2013.01); *G06F 3/04817* (2013.01); *G06F 3/167* (2013.01); *G09G 5/34* (2013.01)

(58) Field of Classification Search
CPC .. G06F 3/04817; G06F 3/04812; G06F 3/167; G09G 5/34
USPC .................................................. 345/156–158
See application file for complete search history.

(56) References Cited

U.S. PATENT DOCUMENTS

2012/0056833 A1* 3/2012 Narita .................. G06F 3/0488
 345/173
2013/0314396 A1 11/2013 Kang et al.
2014/0075330 A1 3/2014 Kwon
2014/0168062 A1 6/2014 Katz et al.

FOREIGN PATENT DOCUMENTS

| | | | |
|---|---|---|---|
| EP | 2426589 | A2 | 3/2012 |
| JP | 2010-211677 | A | 9/2010 |
| JP | 2011-134271 | A | 7/2011 |
| JP | 2012-058919 | A | 3/2012 |
| JP | 2013-205983 | | 10/2013 |
| WO | WO2009/072504 | A1 | 6/2009 |

OTHER PUBLICATIONS

Mar. 13, 2018, EP Communication issued for related EP Application No. 15763658.0.

Apr. 30, 2019, Chinese Office Action issued for related CN Application No. 201580045472.1.

\* cited by examiner

[Fig. 1]
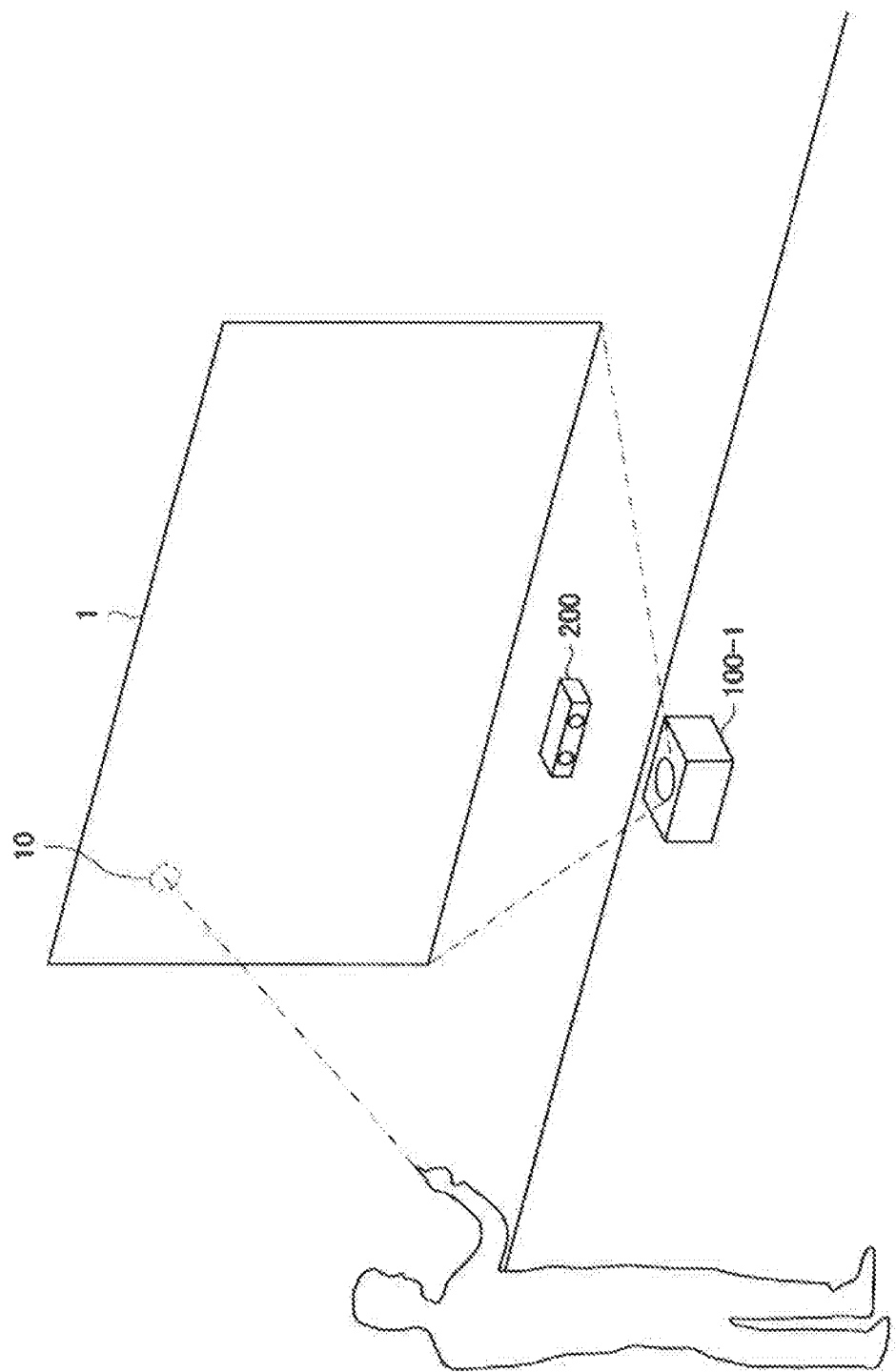

[Fig. 2]
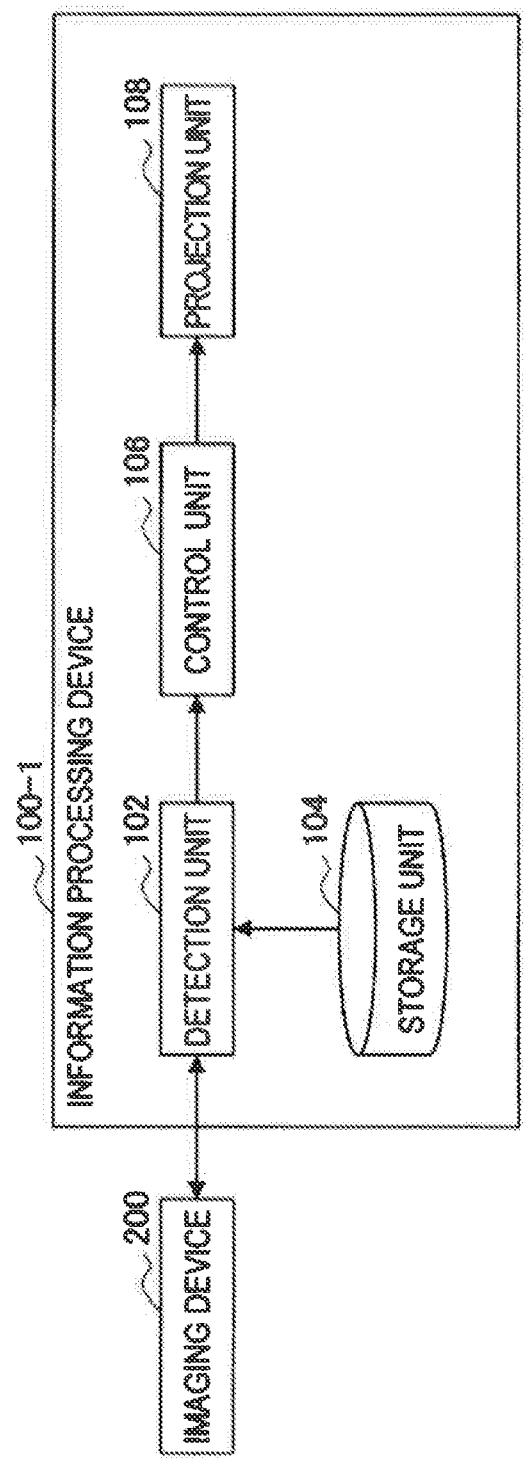

[Fig. 3]
(Related Art)
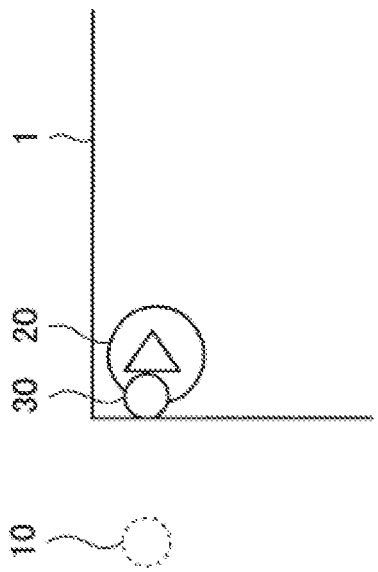
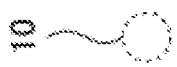
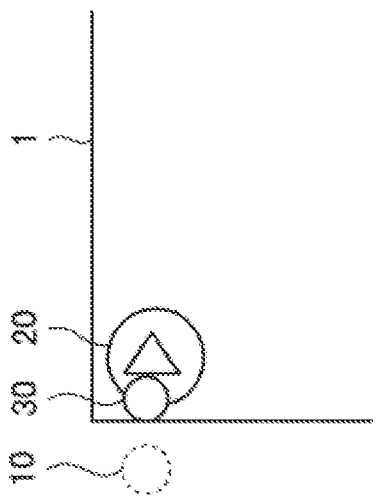

[Fig. 4]
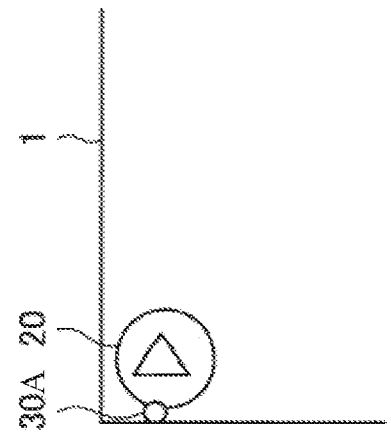
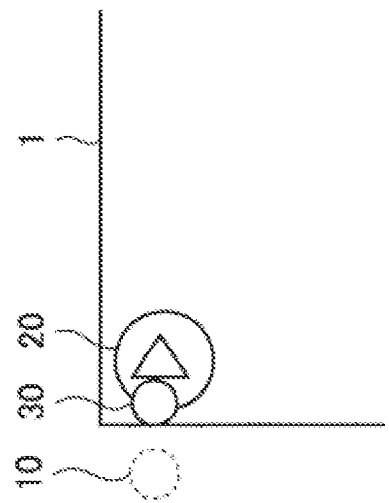

[Fig. 5]
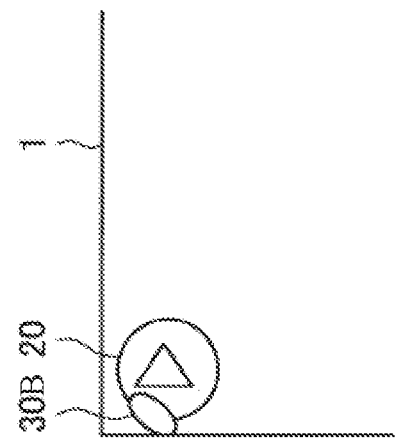
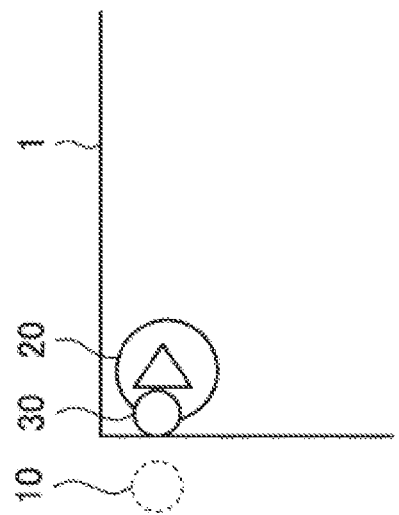

[Fig. 6]
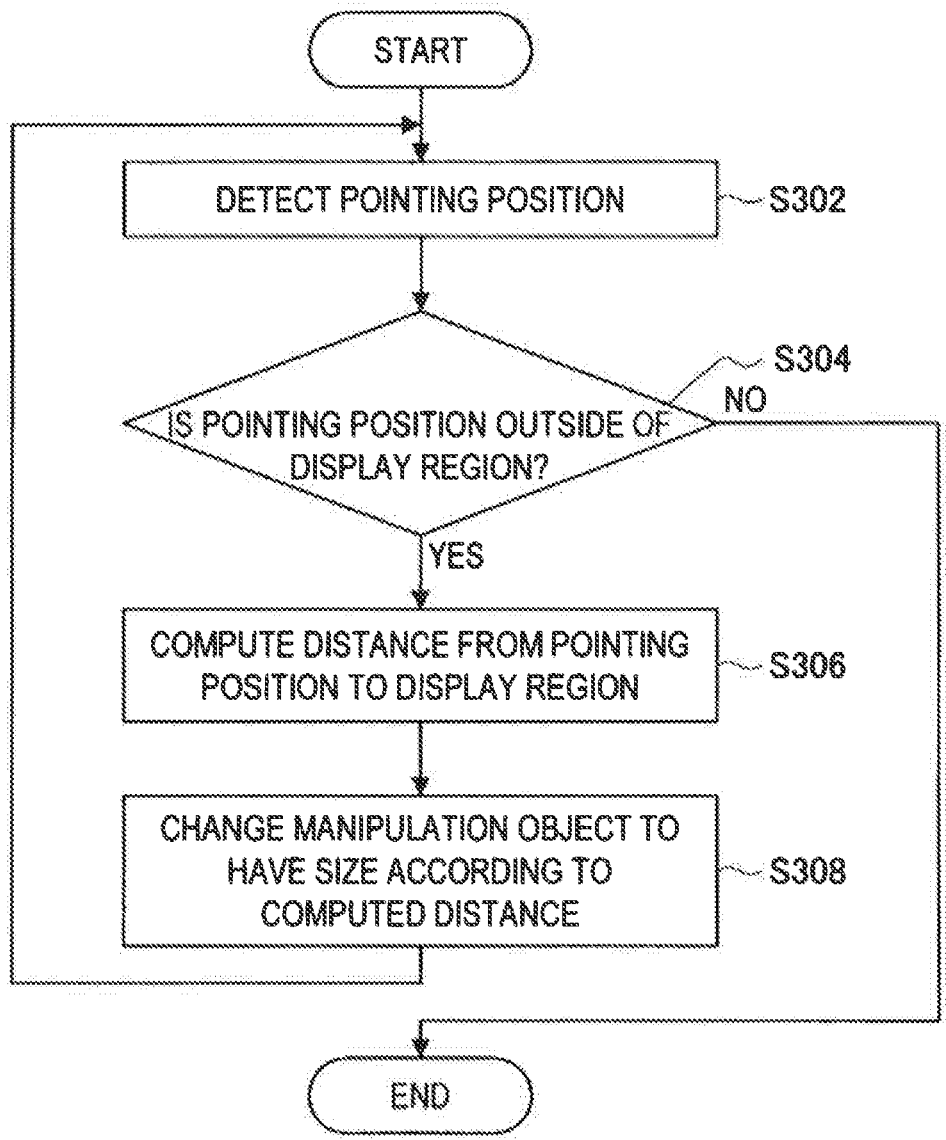

[Fig. 7]
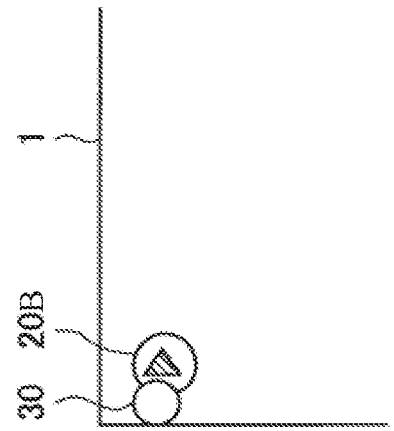
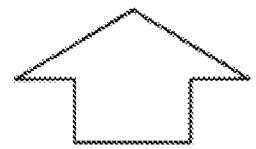
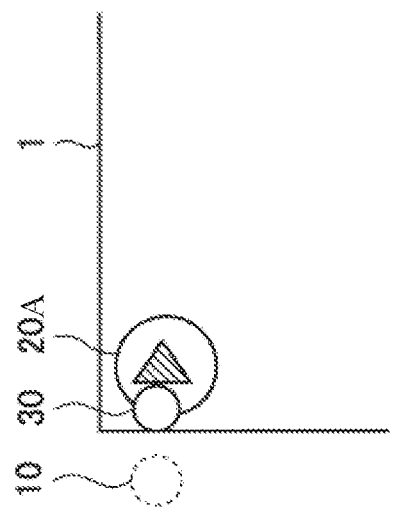

[Fig. 8]
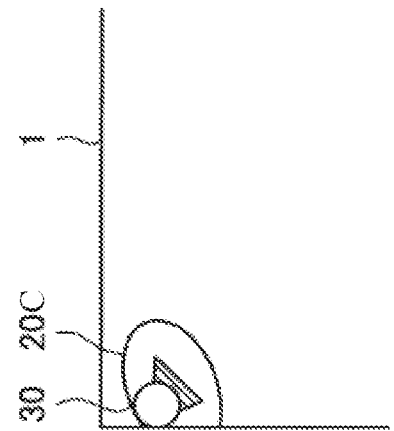
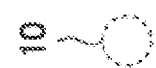
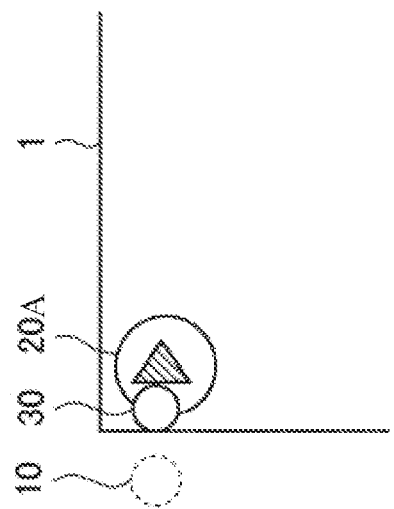

[Fig. 9]
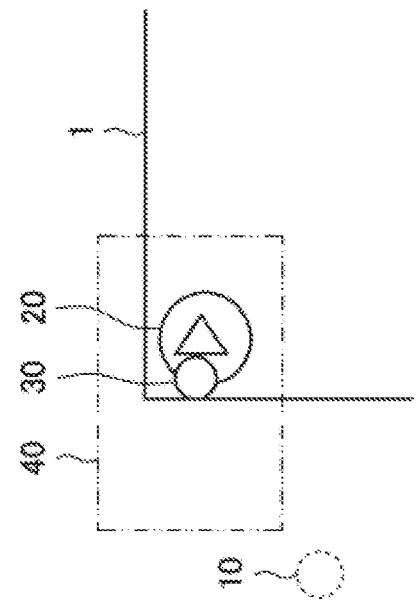
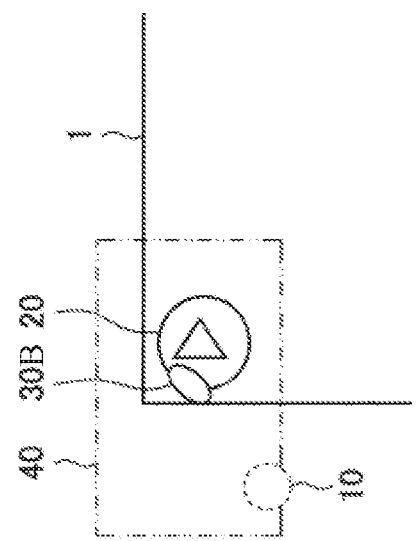

[Fig. 10]
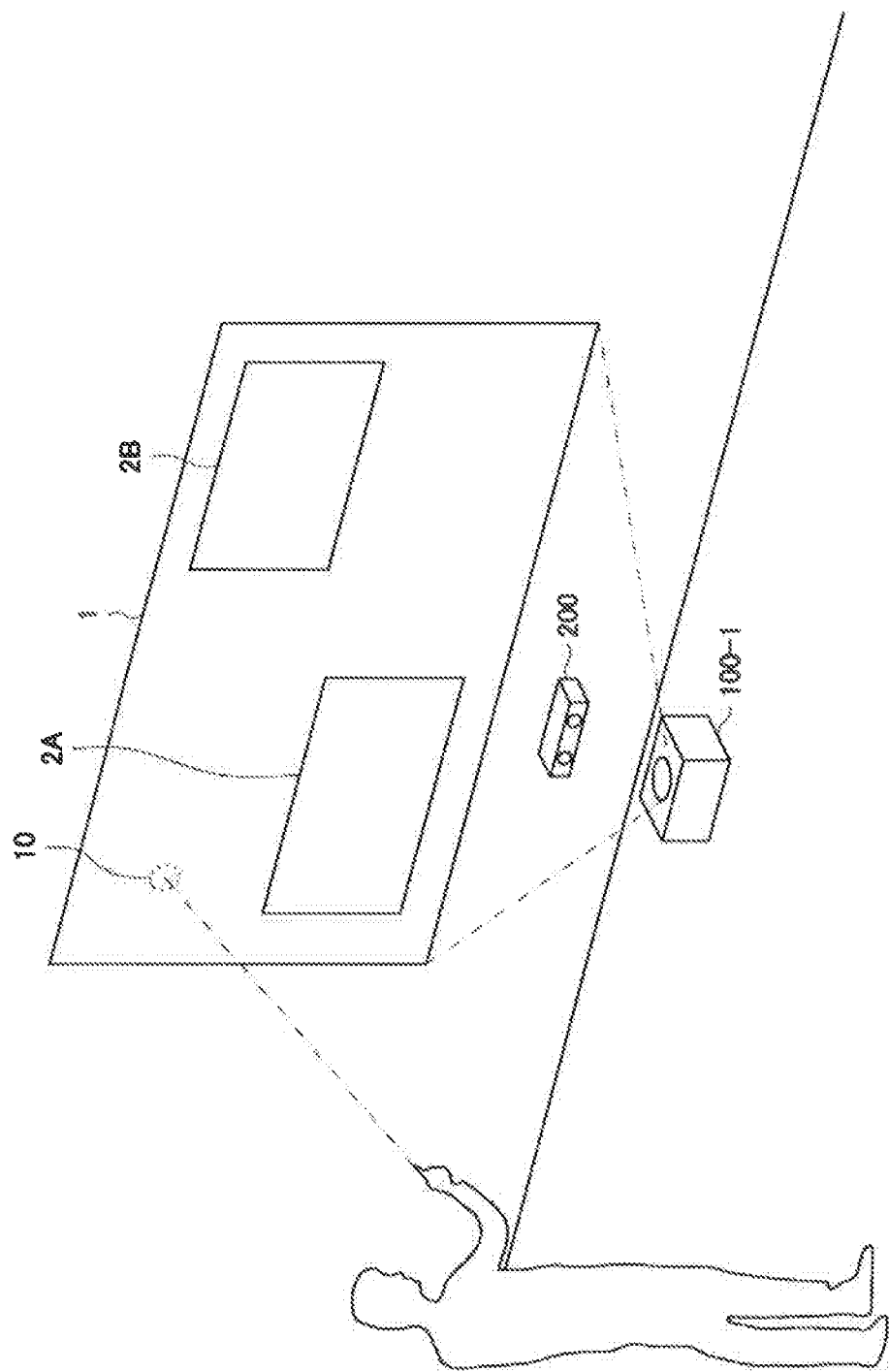

[Fig. 11]
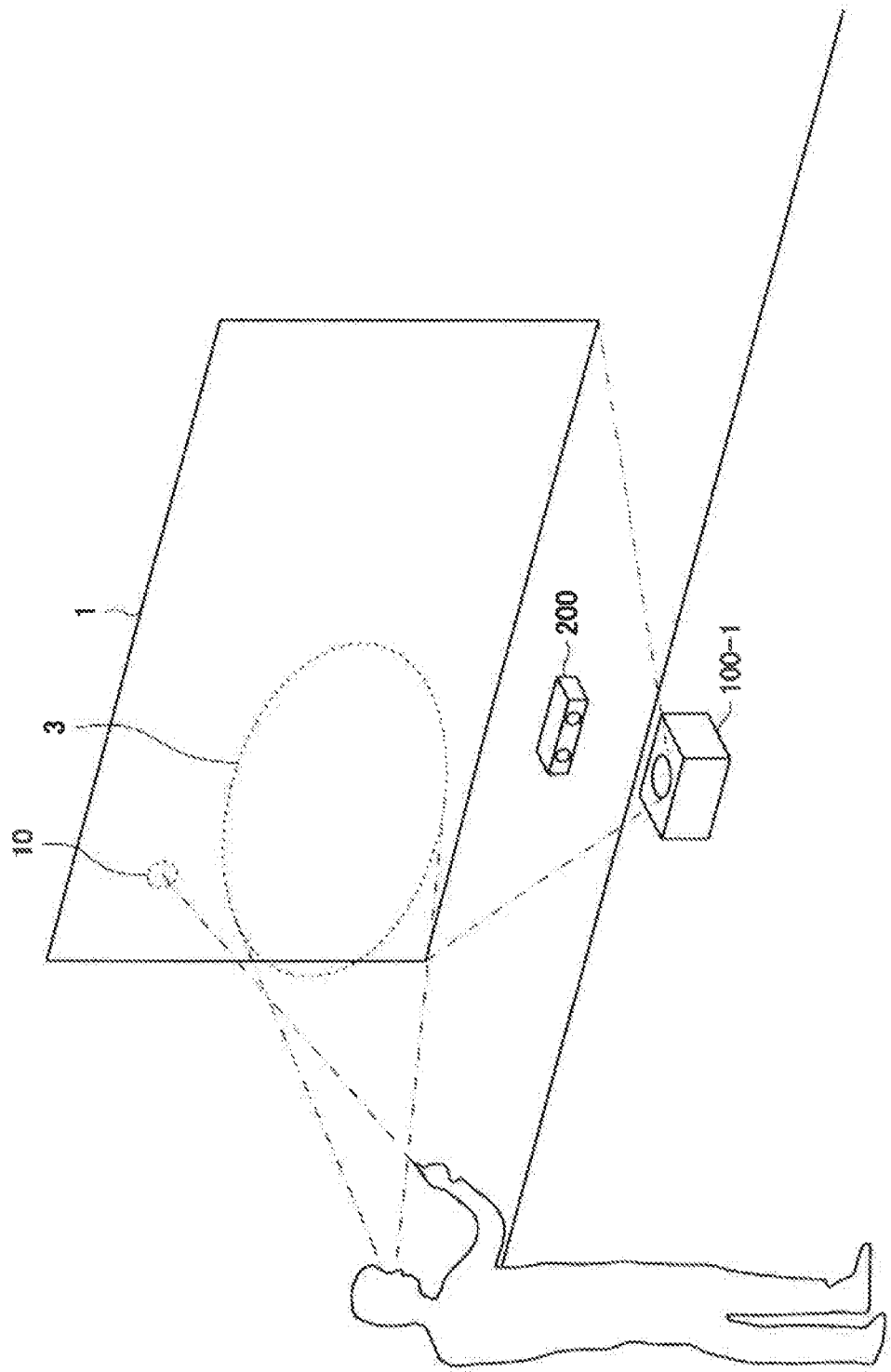

[Fig. 12]
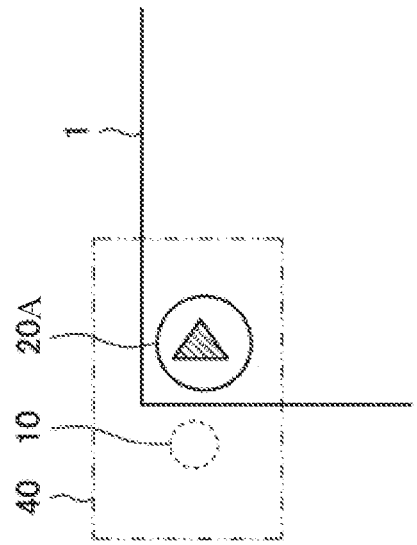
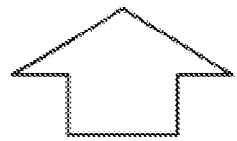
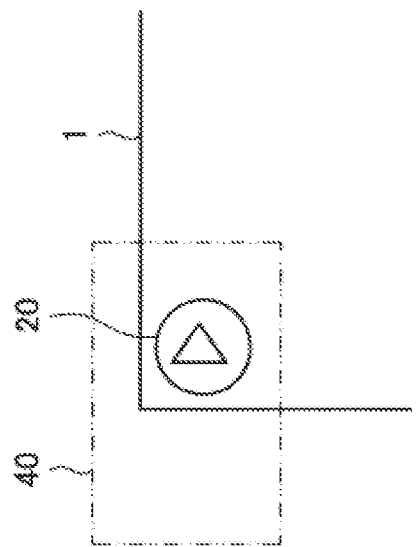

[Fig. 13]
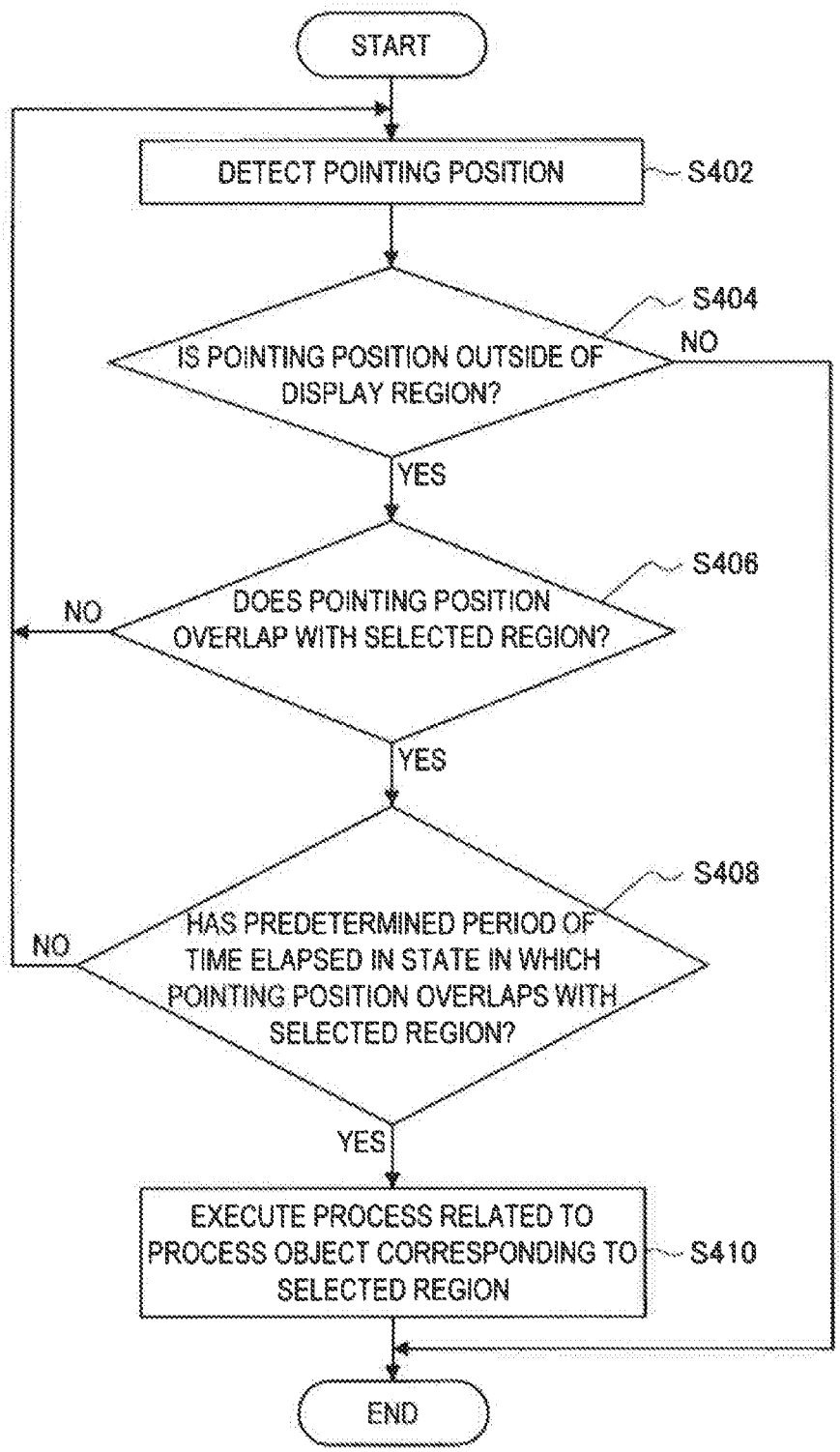

[Fig. 14]
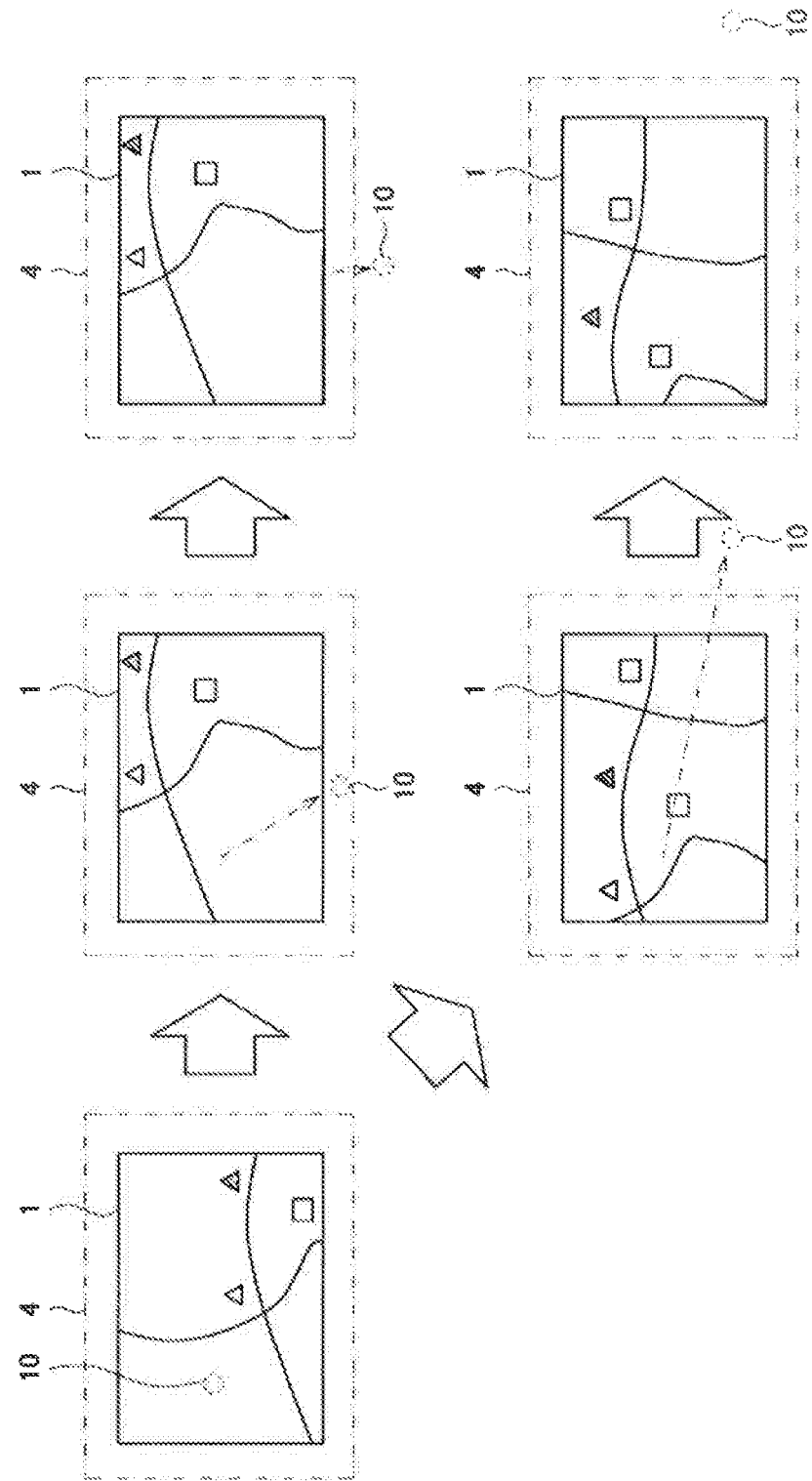

[Fig. 15]
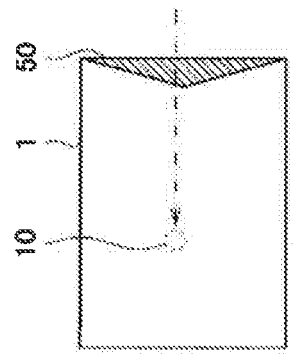
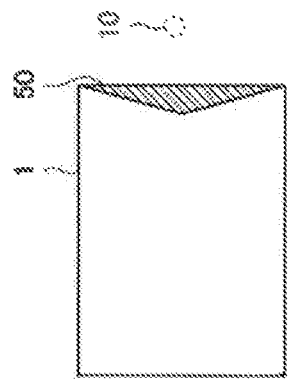
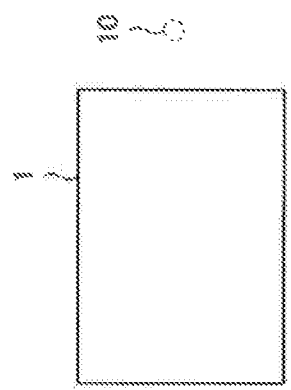

[Fig. 16]
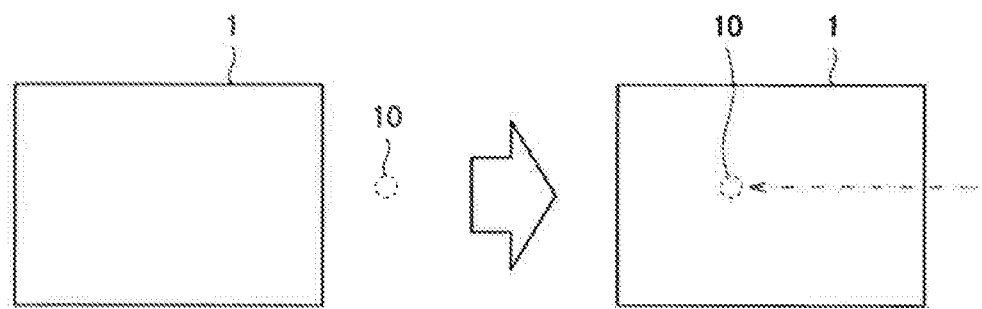

[Fig. 17]
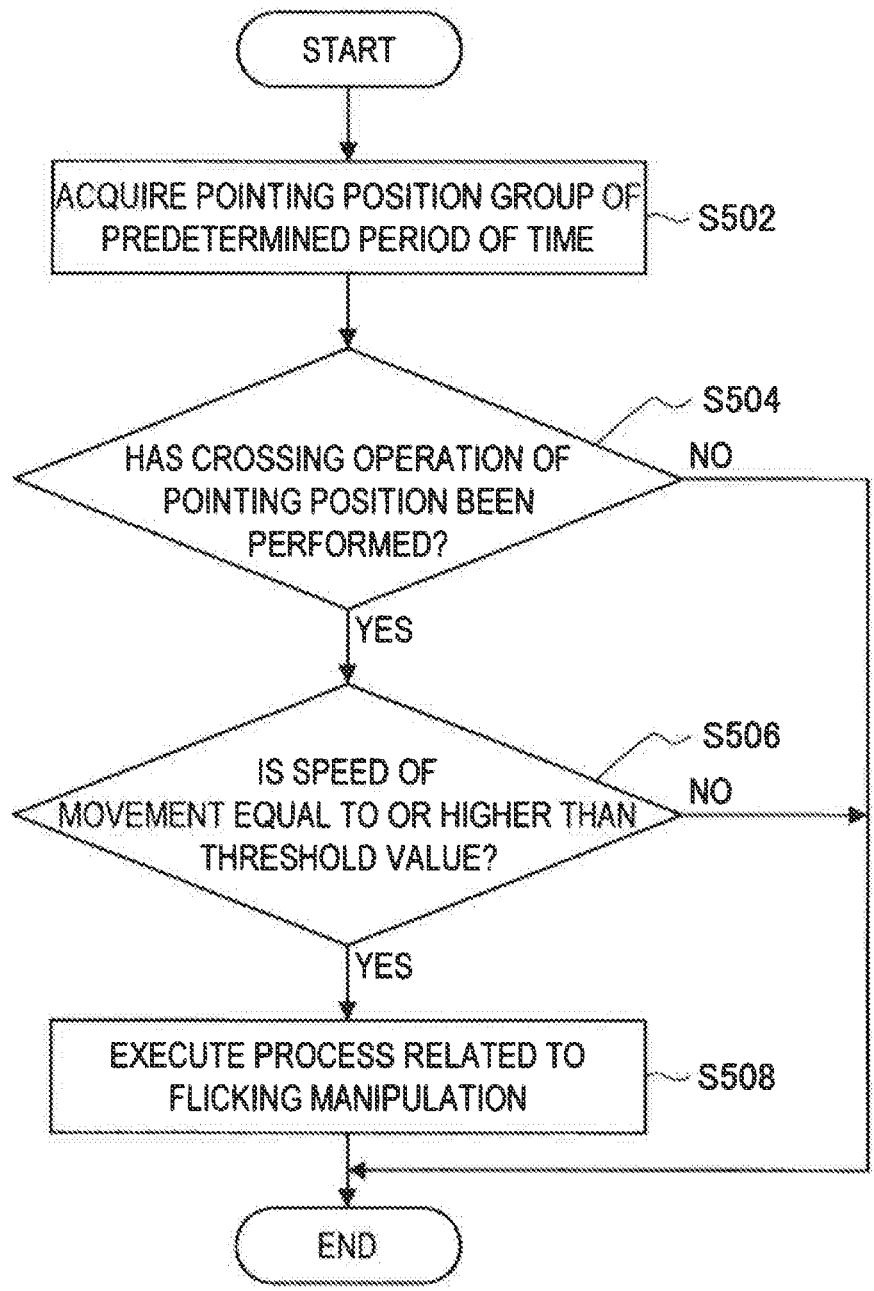

[Fig. 18]
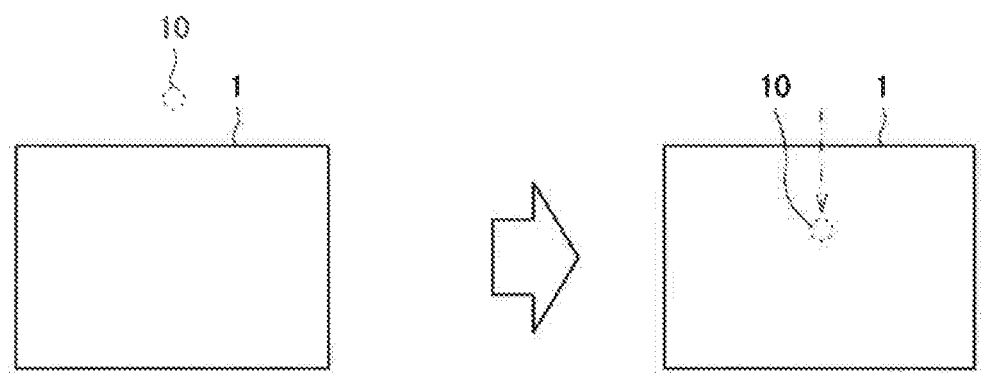

[Fig. 19]
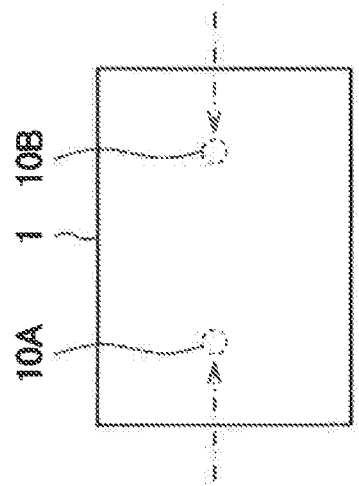
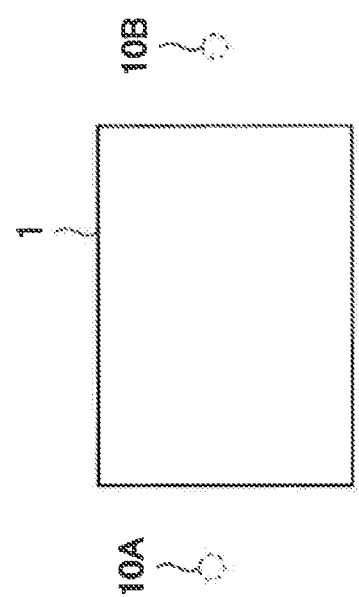

[Fig. 20]
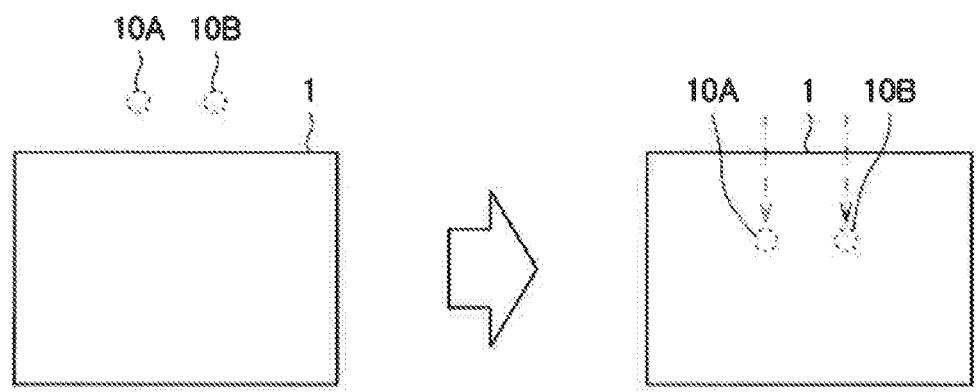
[Fig. 21]
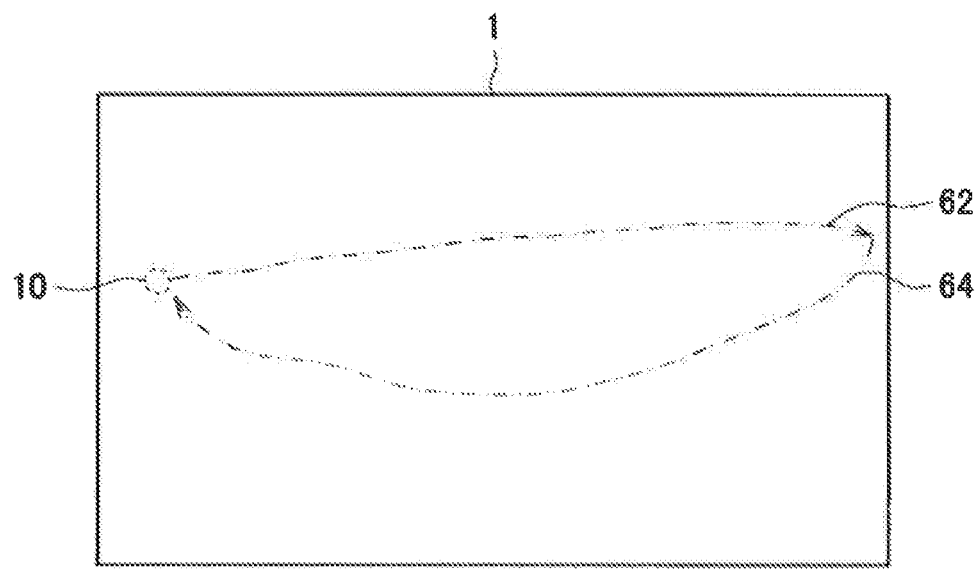

[Fig. 22A]
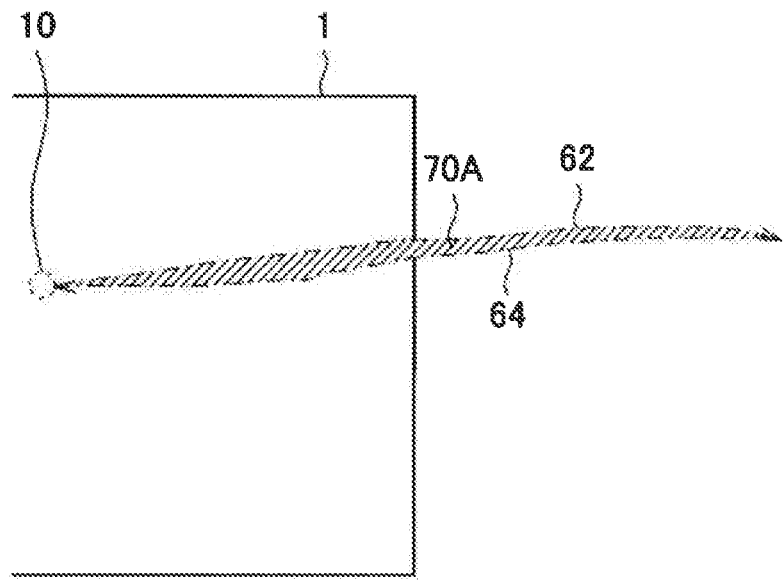
[Fig. 22B]
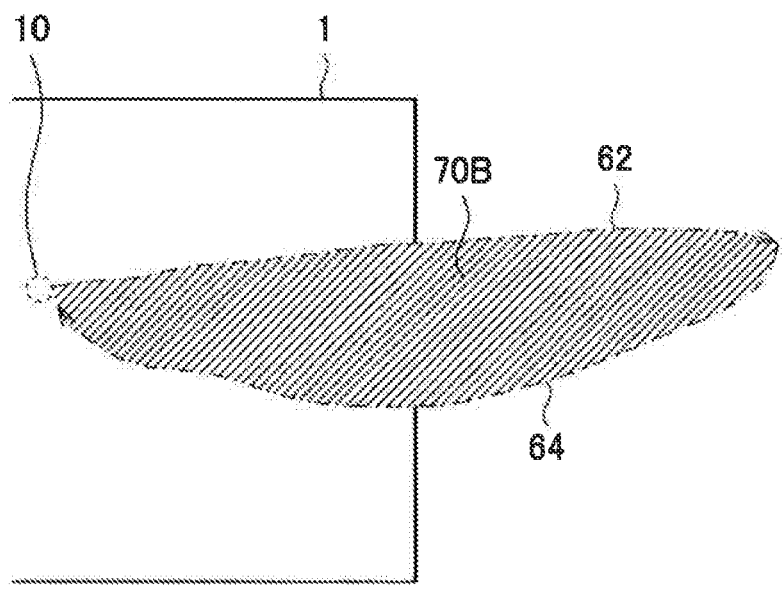

[Fig. 23]
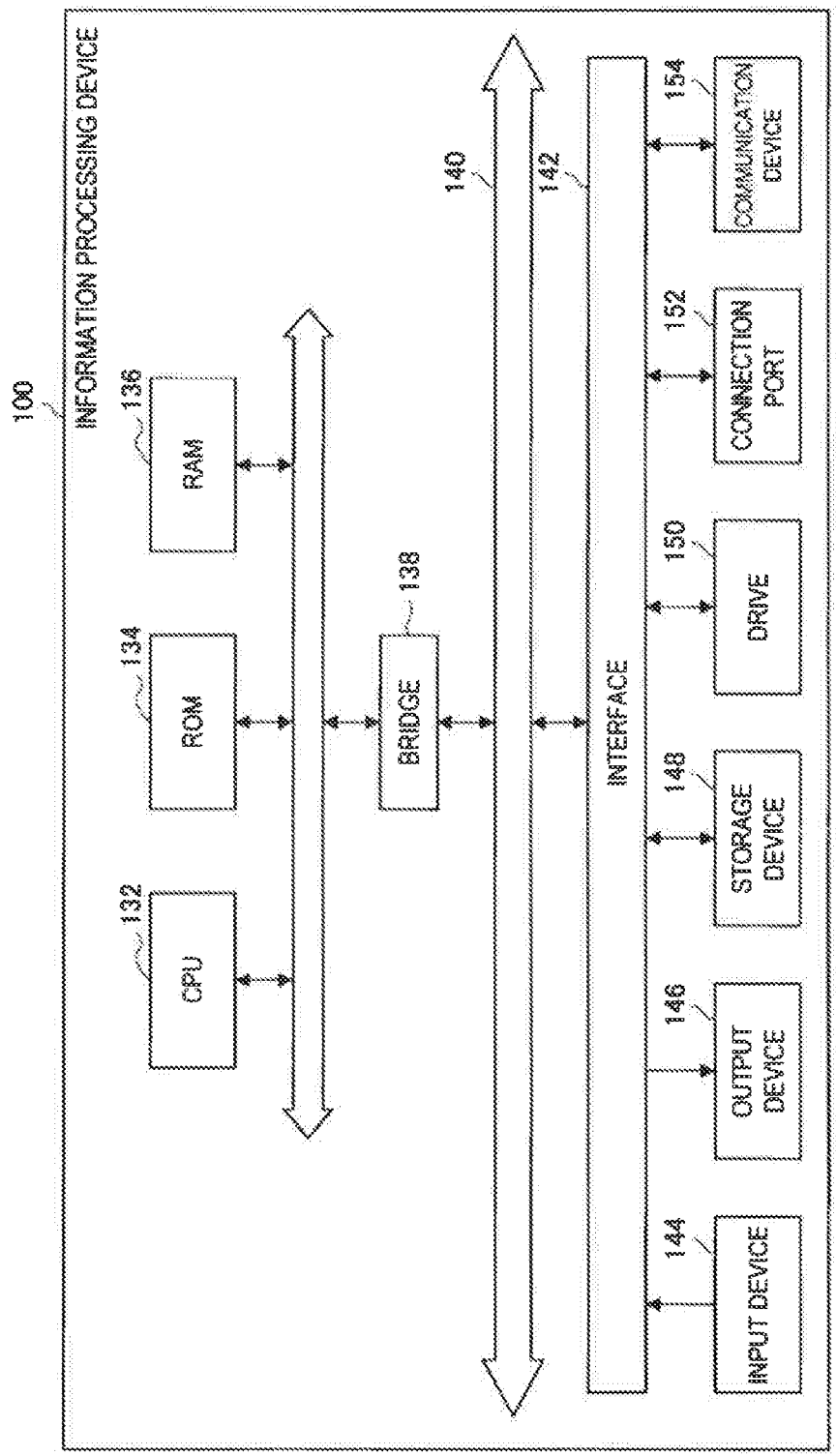

INFORMATION PROCESSING DEVICE, INFORMATION PROCESSING METHOD, AND PROGRAM

CROSS REFERENCE TO RELATED APPLICATIONS

This application is a National Stage Patent Application of PCT International Patent Application No. PCT/JP2015/004426 filed Aug. 31, 2015 under 35 U.S.C. § 371, which claims the benefit of Japanese Priority Patent Application JP 2014-178591 filed Sep. 2, 2014, the entire contents of which are incorporated herein by reference.

TECHNICAL FIELD

The present disclosure relates to an information processing device, an information processing method, and a program.

BACKGROUND ART

Recently, as technologies of detecting attitudes or motions (hereinafter also referred to as gestures) of human beings have progressed, technologies of manipulating devices and the like based on gestures of users have been developed. Particularly, a technology in which a manipulation for designating a position through a manipulation by a manipulating body (hereinafter also referred to as a pointing manipulation) is recognized and an operation of a device is controlled based on the recognized pointing manipulation is generally known.

For example, PTL1 discloses a technology related to an information processing device which recognizes gestures of a hand of a user based on learned three-dimensional model data of human bodies. According to the technology of PTL1, a pointing manipulation can be detected based on a recognized gesture of a hand of a user, and a position designated through the detected pointing manipulation can be specified.

CITATION LIST

Patent Literature

[PTL 1]
JP 2013-205983A

SUMMARY

Technical Problem

In the technology disclosed in PTL1, however, controlling display in a region in which a display object can be displayed (hereinafter also referred to as a display region) through a pointing manipulation performed toward the outside of the display region is not disclosed. For this reason, since a display object for a pointing manipulation is generally displayed in a display region or the like, there is a possibility of visibility of the display content of the display region decreasing during the manipulation.

Thus, the present disclosure proposes a novel and improved information processing device, information processing method, and program which can control display of a display region according to a user manipulation while improving visibility of the display content of the display region or the like.

Solution to Problem

According to an embodiment of the present disclosure, there is provided an information processing device including an acquisition unit configured to acquire manipulation position information representing a manipulation position that is specified based on a manipulation for pointing to an outside of a display region that is a region in which a display object is displayable or an outside of a partial region of the display region associated with a user using a manipulating body at a position distant from the display region, and a control unit configured to control display of the display region based on the manipulation position information acquired by the acquisition unit.

According to an embodiment of the present disclosure, there is provided an information processing method including acquiring manipulation position information representing a manipulation position that is specified based on a manipulation for pointing to an outside of a display region that is a region in which a display object is displayable or an outside of a partial region of the display region associated with a user using a manipulating body at a position distant from the display region, and controlling display of the display region based on the acquired manipulation position information.

According to an embodiment of the present disclosure, there is provided a program causing a computer to realize an acquisition function of acquiring manipulation position information representing a manipulation position that is specified based on a manipulation for pointing to an outside of a display region that is a region in which a display object is displayable or an outside of a partial region of the display region associated with a user using a manipulating body at a position distant from the display region, and a control function of controlling display of the display region based on the manipulation position information acquired through the acquisition function.

Advantageous Effects of Invention

According to one or more of embodiments of the present disclosure as described above, an information processing device, an information processing method, and a program which can control display of a display region according to a user manipulation while improving visibility of the display content of the display region or the like are provided. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a diagram for describing an overview of an information processing device according to an embodiment of the present disclosure.

FIG. 2 is a block diagram illustrating a schematic functional configuration of an information processing device according to a first embodiment of the present disclosure.

FIG. 3 is a diagram illustrating an example of display when a pointing position is isolated from a display region with respect to an information processing device of the related art.

FIG. 4 is a diagram illustrating an example of a display change when a pointing position is isolated from a display region according to a process of an information processing device according to the embodiment.

FIG. 5 is a diagram illustrating another example of a display change when the pointing position is isolated from the display region according to the process of the information processing device according to the embodiment.

FIG. 6 is a flow chart conceptually showing the process of the information processing device according to the embodiment.

FIG. 7 is a diagram illustrating an example of a display change when the pointing position is isolated from the display region according to a process of the information processing device according to the modified example.

FIG. 8 is a diagram illustrating another example of the display change when the pointing position is isolated from the display region according to the process of the information processing device according to the modified example.

FIG. 9 is a diagram illustrating an example of a display change when the pointing position is isolated from the display region according to a process of the information processing device according to the modified example.

FIG. 10 is a diagram illustrating an example of a region associated with a user with respect to the information processing device according to a third modified example of the embodiment.

FIG. 11 is a diagram illustrating another example of the region associated with the user with respect to the information processing device according to the third modified example of the embodiment.

FIG. 12 is a diagram illustrating an example of a display change when a pointing position is isolated from a display region according to a process of an information processing device according to a second embodiment of the present disclosure.

FIG. 13 is a flow chart conceptually showing a process of the information processing device according to the embodiment.

FIG. 14 is a diagram illustrating an example of a display change in a scrolling process of the information processing device according to a first modified example of the embodiment.

FIG. 15 is a diagram illustrating an example in which a manipulation guide object is displayed in a process of the information processing device according to a second modified example of the embodiment.

FIG. 16 is a diagram illustrating an example of a crossing operation of a pointing position in a process of an information processing device according to a third embodiment.

FIG. 17 is a flow chart conceptually showing the process of the information processing device according to the embodiment.

FIG. 18 is a diagram illustrating another example of the crossing operation in the process of the information processing device according to a first modified example of the embodiment.

FIG. 19 is a diagram illustrating an example of a plurality of crossing operations in the process of the information processing device according to a second modified example of the embodiment.

FIG. 20 is a diagram illustrating another example of the plurality of crossing operations in the process of the information processing device according to the second modified example of the embodiment.

FIG. 21 is a diagram for describing erroneous detection of a flicking manipulation in a process of an information processing device of the related art.

FIG. 22A is a diagram illustrating an example of trajectories of the pointing position in opposite-direction consecutive flicking manipulations in a third modified example of the embodiment.

FIG. 22B is a diagram illustrating another example of the trajectories of the pointing position in same-direction consecutive flicking manipulations in the third modified example of the embodiment.

FIG. 23 is an explanatory diagram illustrating a hardware configuration of the information processing device according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. Overview of an information processing device according to an embodiment of the present disclosure 2. First embodiment (Example of a display process according to a distance from a display region)

2-1. Configuration of an information processing device 2-2. Process of the information processing device 2-3. Modified examples 3. Second embodiment (Example of a display process according to a position outside a display region)

3-1. Configuration of an information processing device 3-2. Process of the information processing device 3-3. Modified examples 4. Third embodiment (Example of a display process according to a manipulation performed across a display region)

4-1. Configuration of an information processing device 4-2. Process of the information processing device 4-3. Modified examples 5. Hardware configuration example of the information processing device 6. Conclusion 1. Overview of an Information Processing Device According to an Embodiment of the Present Disclosure First, an overview of an information processing device according to an embodiment of the present disclosure will be described with reference to FIG. 1. FIG. 1 is a diagram for describing the overview of the information processing device according to the embodiment of the present disclosure.

The information processing device 100 according to the embodiment of the present disclosure has a manipulation detection function and a display control function. The manipulation detection function is a function of recognizing a gesture of a user and thereby detecting a manipulation corresponding to the gesture. Particularly, a pointing manipulation in a display region or the like is detected through the manipulation detection function. In addition, the display control function is a function of controlling the content to be displayed in a display device or the like according to a manipulation. Due to these functions, the information processing device 100 can change display content according to pointing manipulations detected from gestures of a user. Note that the information processing device 100 can have a display device or the like built therein.

For example, the information processing device 100 has a projection function projecting display content, and thus projects display content in a display region 1 as illustrated in FIG. 1. In addition, an imaging device 200 is disposed so as to capture the user who performs manipulations and the like with respect to the display region 1, and supplies images obtained through the capturing to the information processing device 100. The information processing device 100 detects a manipulation, for example, a pointing manipulation corresponding to a gesture of the user, for example, a gesture recognized from an attitude of an arm and a hand of the user based on an image supplied from the imaging device 200. Then, the information processing device 100 causes a cursor to be displayed at a position 10 indicated through the detected pointing manipulation.

Here, when display of a display region is controlled based on a pointing manipulation of a user, a display object related to the manipulation, for example, a graphical user interface (GUI) or the like is displayed in the display region, and thus the pointing manipulation is performed within the display region. However, there are cases in which visibility of display content deteriorates due to the display of the GUI or the like. Thus, the information processing device 100 according to the embodiment of the present disclosure acquires a position pointed to in a manipulation of a manipulating body (hereinafter also referred to as a pointing position) of the outside of a display region, and controls display of the display region based on the acquired pointing position.

For example, when the user performs a pointing manipulation outside of the display region 1, the information processing device 100 detects a pointing position that is outside of the display region 1 based on an image provided by the imaging device 200. Then, the information processing device 100 executes a display control process that corresponds to the detected pointing position.

In this manner, the information processing device 100 according to the embodiment of the present disclosure acquires the pointing position of the user outside of the display region and controls display of the display region based on the acquired pointing position. For this reason, because a display object for a manipulation is not displayed in the display region, display of the display region can be controlled while improving visibility of display content of the display region. Note that, although a projection device is illustrated in FIG. 1 as an example of the information processing device 100, the information processing device 100 may be a display device such as a display or a television, or a device such as a smartphone, a tablet terminal, a personal computer, or a server connected to a display device. In addition, for the sake of convenience of description, the respective information processing devices 100 of the first to third embodiments are discriminated by suffixing numbers corresponding to the embodiments, as in an information processing device 100-1, or an information processing device 100-2.

2. First Embodiment (Example of a Display Process According to a Distance from a Display Region)

The overview of the information processing devices 100 according to the embodiment of the present disclosure has been described above. Next, the information processing device 100-1 according to a first embodiment of the present disclosure will be described. The information processing device 100-1 controls display of a display region according to the distance from a pointing position that is outside of the display region to the display region.

2-1. Configuration of an Information Processing Device

First, a configuration of the information processing device 100-1 according to the first embodiment of the present disclosure will be described with reference to FIG. 2. FIG. 2 is a block diagram illustrating the schematic functional configuration of the information processing device 100-1 according to the first embodiment of the present disclosure.

The information processing device 100-1 includes a detection unit 102, a storage unit 104, a control unit 106, and a projection unit 108 as illustrated in FIG. 2. Note that the information processing device 100-1 is connected with the imaging device 200 through communication.

The detection unit 102, as an acquisition unit, detects user manipulations. To be specific, the detection unit 102 detects a direction of pointing in a manipulation of a manipulating body (hereinafter also referred to as a pointing direction) based on an image provided by the imaging device 200 or the like. Further, the detection unit 102 detects a pointing position as a manipulation position based on the pointing direction. Note that the manipulating body can include a manipulation object such as a hand or an arm of a user, or a pointing rod.

To be more specific, the detection unit 102 performs an imaging request to the imaging device 200, and based on an image provided by the imaging device 200 as a response to the imaging request, three-dimensional model information of a human body stored in the storage unit 104, and the like, detects a pointing direction. Then, the detection unit 102 detects an intersection of the detected pointing direction and a plane on which display content is projected by the projection unit 108 as a pointing position. For detection of the pointing direction and the pointing position, for example, a technology that uses information obtained from a motion sensor or the like or other general pointing technology can be used in addition to a technology that uses an image analysis technology.

Note that the pointing position may be a position to which the user actually points, or a position specified based on a position to which the user points. For example, when it is estimated that there are a plurality of positions to which the user points, a pointing position can be the center of a circle which includes the estimated positions. In addition, detection of a pointing position can be performed at a predetermined time interval.

The storage unit 104 stores information used in detection of user manipulations. To be specific, the storage unit 104 stores model information such as human body models and hand models. Note that the storage unit 104 may be an acquisition unit which acquires model information and the like from an external device through communication or the like.

The control unit 106 controls operations of the information processing device 100-1. To be specific, the control unit 106 controls display of a display region based on a positional relation between a pointing position that is outside of the display region and the display region. Further, a process of the control unit 106 will be described in more detail with reference to FIGS. 3 to 5. FIG. 3 is a diagram illustrating an example of display when a pointing position is isolated from a display region with respect to an information processing device of the related art. In addition, FIG. 4 is a diagram illustrating an example of a display change when the pointing position is isolated from the display region according to a process of the information processing device 100-1 according to the present embodiment, and FIG. 5 is a diagram illustrating another example of a display change when the pointing position is isolated from the display region according to the process of the information processing device 100-1 according to the present embodiment.

First, the control unit 106 causes a manipulation object to be displayed in a display region based on a pointing position detected by the detection unit 102. For example, when the pointing position 10 is within the display region 1, the control unit 106 causes a cursor 30 to be displayed at the pointing position 10 as a manipulation object. In addition, when the pointing position 10 is outside of display region 1, the control unit 106 causes the cursor 30 to be displayed at a position on the display region 1 that is closer to the pointing position 10 than any other position of the display region 1 as illustrated in the left drawing of FIG. 3. Note that the control unit 106 can cause, for example, an icon 20 to be displayed in the display region 1 as a process object related to execution of a process and thereby the icon 20 can be selected or the like through a manipulation of the cursor 30.

Next, when the pointing position is moved, the control unit 106 changes a display position of the manipulation object so as to match the pointing position. For example, when the pointing position 10 is moved in the display region 1, the control unit 106 changes the position of the cursor 30 to match the movement of the pointing position 10.

Here, in the information processing device of the related art, when the pointing position was moved to the outside of the display region, it was difficult to change display of the manipulation object. For example, in the information processing device of the related art, when the pointing position 10 is moved in a direction in which it is separated from the display region 1 outside the display region 1, there is no difference in display of the cursor 30 before and after the movement of the pointing position 10 as illustrated in the right drawing of FIG. 3. For this reason, a user has difficulty knowing whether the pointing manipulation has been recognized, and thus checks whether the information processing device is operating normally using another method.

Therefore, in the information processing device 100-1 according to the first embodiment of the present disclosure, the control unit 106 controls display of the manipulation object according to a distance from the pointing position that is outside of the display region to the display region. For example, when the pointing position 10 is moved in a direction in which it is isolated from the display region 1 outside the display region 1, the control unit 106 causes the cursor 30 to be reduced to a cursor 30A according to the distance from the pointing position 10 to the display region 1 as illustrated in the right drawing of FIG. 4.

In addition, when the pointing position 10 is moved in a direction in which it is separated from the display region 1 outside the display region 1, the control unit 106 may distort the cursor 30 according to a distance from the display region 1 to the pointing position 10 as illustrated in the right drawing of FIG. 5. Further, the control unit 106 can distort the cursor 30 to a cursor 30B in the direction from the cursor 30B to the pointing position 10. In this case, as the degree of isolation of the pointing position 10 from the display region is indicated to the user, the user can infer the pointing position 10 that is outside of the display region 1, and thus manipulation performance outside the display region can be improved.

Note that, although the example in which the cursor 30 is reduced or distorted according to a distance from the pointing position 10 to the display region has been described above, the cursor 30 may be enlarged according to the distance, or may change its color, shape, pattern, or the like. In addition, the cursor 30 may change into another image according to the distance.

Here, returning to FIG. 2, the projection unit 108 projects display content based on an instruction of the control unit 106. To be specific, the projection unit 108 projects an image, a video, or the like generated by the control unit 106 in a projection direction. For example, the projection unit 108 can be a cathode ray tube (CRT), a projector which uses liquid crystal, or the like. Note that the projection unit 108 may be a display unit such as a display which uses liquid crystal or organic electro-luminescence EL).

In addition, the imaging device 200 performs imaging according to a request from the information processing device 100-1. To be specific, when an imaging request is received from the detection unit 102, the imaging device 200 performs imaging according to the imaging request, and provides an image obtained from the imaging to the information processing device 100-1. For example, the imaging device 200 has two or more imaging units and performs imaging using the respective imaging units. Note that the number of installed imaging devices 200 may be plural, and the respective imaging devices 200 can be connected to the information processing device 100-1. In addition, an installation place of the imaging device 200 is not limited to the lower side of the display region 1 as illustrated in FIG. 1, and the imaging device 200 can be installed at any position at which a user who performs manipulations toward the display region 1 can be captured as a subject.

2-2. Process of the Information Processing Device

Next, the process of the information processing device 100-1 according to the present embodiment will be described with reference to FIG. 6. FIG. 6 is a flow chart conceptually showing the process of the information processing device 100-1 according to the present embodiment.

First, the information processing device 100-1 detects a pointing position (Step S302). To be specific, the detection unit 102 performs an imaging request to the imaging device 200 at a predetermined time interval, then detects a pointing direction based on an image provided from the imaging device 200 that is a response to the imaging request, and thereby detects a pointing position based on the pointing direction.

Next, the information processing device 100-1 determines whether the pointing position is outside of the display region (Step S304). To be specific, the control unit 106 determines whether the pointing position detected by the detection unit 102 is outside of the display region. Note that, when the pointing position is determined to be within the display region, the control unit 106 causes the cursor to move to the pointing position.

When the pointing position is determined to be outside of the display region, the information processing device 100-1 computes the distance from the pointing position to the display region (Step S306). To be specific, the control unit 106 computes the distance from the pointing position to the position that is closer to the pointing position than any other position of the display region. Note that the control unit 106 may compute the distance from the pointing position to the display position of the cursor 30 displayed in the display region.

Next, the information processing device 100-1 changes the manipulation object to have a size according to the computed distance (Step S308). To be specific, the control unit 106 decides a size of the cursor according to the computed distance from the pointing position to the display region, and changes display of the cursor to have the decided size. Then, the control unit 106 causes the projection unit 108 to project the display content that has undergone the change.

As described above, according to the first embodiment of the present disclosure, the pointing position of the user is detected outside of the display region, and display of the display region is controlled based on the detected pointing position. For this reason, as the display object for pointing manipulations may not be displayed in the display region, the display of the display region can be controlled according to a user manipulation while improving visibility of the display content in the display region.

In addition, the control unit 106 controls display of the display region based on a positional relation between the pointing position that is outside of the display region and the display region. For this reason, as the pointing position that is outside of the display region is indicated to the user, manipulation performance outside the display region can be improved.

In addition, the control unit 106 controls display of the display region according to the distance from the pointing position that is outside of the display region to the display region. Due to this control, the user can easily know the pointing position that is not displayed more accurately, and manipulation performance outside the display region can be further improved.

In addition, the control unit 106 controls display of the manipulation object displayed at a position in the display region specified based on the pointing position according to the distance from the pointing position to the display region. Due to this control, as display of the manipulation object closely related to the pointing position changes, the user can intuitively understand a change of the pointing position that is outside of the display region.

2-3. Modified Example

The first embodiment of the present disclosure has been described above. Note that the present embodiment is not limited to the above-described example. Hereinbelow, first to third modified examples of the present embodiment will be described.

First Modified Example

As the first modified example of the present embodiment, the information processing device 100-1 may control display of a process object related to execution of the process according to a distance from the pointing position to the display region as in the case of the manipulation object. To be specific, the control unit 106 causes the process object to be displayed in the display region and controls display of the process object according to a distance from the pointing position to the display region. Further, a process of the present modified example will be described in detail with reference to FIGS. 7 and 8. FIG. 7 is a diagram illustrating an example of a display change when the pointing position is isolated from the display region according to the process of the information processing device 100-1 according to the present modified example, and FIG. 8 is a diagram illustrating another example of the display change when the pointing position is isolated from the display region according to the process of the information processing device 100-1 according to the present modified example.

First, the control unit 106 causes the process object to be displayed in the display region, and causes the manipulation object to be displayed in the display region based on the pointing position detected by the detection unit 102. Note that description of details of the process will be omitted due to the fact that it is substantially the same as the process of the first embodiment.

Next, the control unit 106 selects the process object based on a manipulation of the manipulation object. For example, when the cursor 30 stays at a position at which it overlaps with the icon 20 for a predetermined period of time as illustrated in the left drawing of FIG. 7, the control unit 106 determines that the icon 20 has been selected, and causes the state of the icon 20 to transition to a selected state 20A.

Next, when the pointing position is moved in a direction in which it is isolated from the display region outside the display region, the control unit 106 controls display of the process object according to the distance from the pointing position to the display region. For example, when the pointing position 10 is moved in a direction in which it is isolated from the display region 1, the control unit 106 reduces the size of the icon 20A to an icon 20B according to the distance from the pointing position 10 to the display region 1 as illustrated in the right drawing of FIG. 7.

In addition, when the pointing position is moved in the direction in which it is isolated from the display region, the control unit 106 may distort display of the process object according to the distance from the pointing position to the display region. For example, when the pointing position 10 is moved in the direction in which it is isolated from the display region 1 as illustrated in the right drawing of FIG. 8, the control unit 106 distorts the icon 20A according to the distance from the display region 1 to the pointing position 10. Further, the control unit 106 can distort the icon 20A to an icon 20C in the direction from the icon 20C to the pointing position 10.

In this manner, according to the first modified example of the present embodiment, the control unit 106 causes the process object to be displayed in the display region, and then controls display of the process object according to a distance from the pointing position to the display region. Due to the control, as display of the process object which the user considers a manipulation target is changed, it is easier to cause the user to be aware of the change of the pointing position that is outside of the display region.

Second Modified Example

As the second modified example of the present embodiment, when the pointing position is excessively separated from the display region, the information processing device 100-1 may halt the display control being executed. To be specific, when the pointing position is moved out of a predetermined range outside the display region adjacent to the display region, the control unit 106 halts the display control being executed or to be executed. Further, details of the process of the present modified example will be described with reference to FIG. 9. FIG. 9 is a diagram illustrating an example of a display change when the pointing position is isolated from the display region according to the process of the information processing device 100-1 according to the present modified example.

First, when the pointing position is changed outside the display region, the control unit 106 determines whether the pointing position is within a predetermined range outside the display region. For example, when the pointing position 10 is moved outside the display region 1, the control unit 106 determines whether the pointing position 10 is positioned within the predetermined range 40 outside the display region 1. Then, when the pointing position 10 is determined to be positioned within the predetermined range 40, the control unit 106 performs display control of the cursor 30B, for example, a distortion process of the cursor 30. Note that description of the display control process of the cursor 30 will be omitted due to the fact that it is substantially the same as the process of the first embodiment.

When the pointing position is determined to be out of the predetermined range, the control unit 106 halts the display control of the display region. For example, when the pointing position 10 is moved out of the predetermined range 40 outside the display region 1 as the user lowers his or her arm that is involved in the pointing manipulation as illustrated in the right drawing of FIG. 9, the control unit 106 halts the distortion process of the cursor 30B, and display of the cursor 30 returns to normal.

Note that when display of the cursor 30 returns to normal, the control unit 106 may halt another process that is different from the display control being executed or to be executed. For example, during a drag-and-drop manipulation, the control unit 106 halts the drag-and-drop process when display of the cursor 30 returns to normal, and the display object that is a manipulation target, for example, the icon 20 or the like, returns to the original position.

In this manner, according to the second modified example of the present embodiment, when the pointing position is moved out of the predetermined range outside the display region adjacent to the display region, the control unit 106 halts the display control being executed. For this reason, as the display control being executed is cancelled due to the movement of the pointing position out of the predetermined range outside the display region, the user does not have to perform a manipulation of returning the pointing position to the display region and cancelling the display control, and thus convenience can be improved.

Note that, although the example in which the control unit 106 halts the display control has been described above, the control unit 106 may stop a display control unit. For example, when the pointing position 10 is moved out of the predetermined range 40 outside the display region 1, the control unit 106 may stop the distortion process of the cursor 30 and then cause the cursor 30 to remain distorted. In this case, as display of cancellation of the display control is emphasized, it is possible to cause the user to be aware of the cancellation.

In addition, although the example in which the control unit 106 halts the display control based on a movement of the pointing position out of the predetermined range has been described above, the control unit 106 may halt display control based on a distance between the pointing position and the display region. For example, the control unit 106 computes the distance between the pointing position and the display region each time the pointing position is detected outside of the display region. Then, when the computed distance is equal to or longer than a predetermined distance, the control unit 106 halts or stops display control in the display region.

In addition, the control unit 106 may halt display control based on the speed of a change in the distance between the pointing position and the display region. For example, when a change in the distance between the pointing position and the display region computed each time the pointing position is detected is greater than a threshold value, the control unit 106 halts or stops display control of the display region. In this case, the user can cancel the display control or the like at an arbitrary position outside the display region, and thus convenience can be further improved.

Third Modified Example

As the third modified example of the present embodiment, the information processing device 100-1 may detect a pointing position outside a region associated with the user, rather than the display region, and control display of a display region related to the region based on the detected pointing position. To be specific, the control unit 106 causes the pointing position of the user outside a manipulation region that is associated with the user and within the display region to be detected, and controls display in the manipulation region based on the detected pointing position. Further, details of a process of the present modified example will be described with reference to FIG. 10. FIG. 10 is a diagram illustrating an example of the region associated with the user with respect to the information processing device 100-1 according to the third modified example of the present embodiment.

Window Associated with the User

First, the control unit 106 associates a manipulation region displayed in a display region with the user who performs a manipulation in the manipulation region. For example, the manipulation region can be a window in a Windows system, and the control unit 106 can cause windows 2A and 2B to be displayed in the display region 1 as illustrated in FIG. 10. Then, when generation or a manipulation of the window 2A is performed, the control unit 106 specifies the user who has performed the generation or manipulation, associates the specified user with the window 2A, and causes the storage unit 104 or the like to store the association. Note that specification of a user can be performed using a face recognition technology or the like.

Next, when a pointing position is detected, the control unit 106 specifies the user who performs a pointing manipulation. For example, when the detection unit 102 detects the pointing position, the control unit 106 specifies the user who performs the pointing manipulation.

Then, when the pointing position is outside of the manipulation region associated with the specified user, the control unit 106 controls a process of the manipulation region based on the pointing position. For example, the control unit 106 specifies the window 2A associated with the specified user from the association information stored in the storage unit 104 and determines whether the pointing position is outside of the window 2A. When the pointing position is outside of the window 2A, the control unit 106 performs display control on the window 2A based on the pointing position 10.

As described above, according to the third modified example of the present embodiment, the control unit 106 causes the pointing position of the user that is in the display region but outside of the manipulation region associated with the user to be detected and controls display on the manipulation region based on the detected pointing position. For this reason, as display control of the manipulation region is performed without displaying the manipulation object even though it is manipulated within the display region, a manipulation in the display region that is larger than the user can be easily performed without deterioration of visibility of the outside of the manipulation region in the display region.

Field of View of a User

Note that the region associated with the user may be a field of view of the user. To be specific, when the pointing position is detected, the control unit 106 specifies the user who performs the pointing manipulation related to the pointing position, and determines a field of view of the user. When the pointing position is outside of the field of view of the user, the control unit 106 controls display of a region related to the field of view of the user based on the pointing position. Details thereof will be further described with reference to FIG. 11. FIG. 11 is a diagram illustrating another example of the region associated with the user with respect to the information processing device 100-1 according to the third modified example of the present embodiment.

First, when the pointing position is detected, the control unit 106 specifies the user who performs the pointing manipulation related to the pointing position. Note that description of the user specification process will be omitted due to the fact that it is substantially the same as the above-described process.

Next, the control unit 106 determines a field of view of the specified user. For example, when the user who performs the pointing manipulation is specified, the control unit 106 determines a field of view 3 of the specified user as illustrated in FIG. 11 based on field of view information of the user stored in the storage unit 104. The field of view of the user can be, for example, a discriminative field of view, an effective field of view, a gaze-stabilized field of view, or the like. In addition, the information related to the field of view of the user can be stored in the storage unit 104 or the like in advance.

Then, when the pointing position is outside of the determined field of view of the user, the control unit 106 controls a process based on the pointing position. For example, the control unit 106 determines whether the pointing position is outside of the determined field of view 3 of the user. When the pointing position is determined to be outside of the field of view 3 of the user, the control unit 106 performs the process based on the pointing position 10, for example, display control with respect to the field of view 3 of the user.

In this case, as display of the region related to the field of view of the user is controlled without blocking the eyesight of the user, visibility with respect to display content within the field of view of the user can be further improved.

3. Second Embodiment (Example of a Display Process According to a Position Outside a Display Region)

The information processing device 100-1 according to the first embodiment of the present disclosure has been described above. Next, an information processing device 100-2 according to a second embodiment of the present disclosure will be described. The information processing device 100-2 controls display of a display region according to a pointing position outside the display region.

3-1. Configuration of an Information Processing Device

The functional configuration of the information processing device 100-2 is substantially the same as that according to the first embodiment, but the function of the control unit 106 is partially different.

The control unit 106 executes display control corresponding to the pointing position that is outside of the display region. To be specific, when the pointing position is in a selected area outside the display region associated with a process object to be displayed in the display region, the control unit 106 executes a process related to the process object. Details of the process of the present embodiment will be further described with reference to FIG. 12. FIG. 12 is a diagram illustrating an example of a display change when a pointing position is isolated from a display region according to the process of the information processing device 100-2 according to the present embodiment.

First, the control unit 106 sets a selected region corresponding to a displayed process object. For example, the control unit 106 causes the icon 20 to be displayed in the display region 1, and sets a selected region 40 corresponding to the icon 20 to overlap with or come close to the icon 20 as illustrated in the left drawing of FIG. 12. Note that the selected region 40 is set to span inside and outside the display region 1 in FIG. 12, but may be set to span only outside the display region 1. In addition, setting information of the selected region 40 can be stored in the storage unit 104 as coordinate information for each icon 20.

Then, when the pointing position is detected outside of the display region, the control unit 106 determines whether the pointing position overlaps with the selected region. For example, when the detection unit 102 detects the pointing position 10, the control unit 106 determines whether the pointing position 10 overlaps with the selected region 40.

When the pointing position is determined to overlap with the selected region, the control unit 106 executes a process related to the process object corresponding to the selected region. For example, when the control unit 106 determines that the pointing position 10 overlaps with the selected region 40 for a predetermined period of time, the control unit executes a process related to the icon 20A corresponding to the selected region 40, for example, a process object selection determination process.

3-2. Process of the Information Processing Device

Next, the process of the information processing device 100-2 according to the present embodiment will be described with reference to FIG. 13. FIG. 13 is a flow chart conceptually showing the process of the information processing device 100-2 according to the present embodiment. Note that description of processes that are substantially the same as those of the first embodiment will be omitted.

First, the information processing device 100-2 detects the pointing position (Step S402), and determines whether the pointing position is outside of the display region (Step S404).

When the pointing position is determined to be outside of the display region, the information processing device 100-2 determines whether the pointing position overlaps with the selected region (Step S406). To be specific, the control unit 106 determines whether any part of the selected region corresponding to the process object displayed in the display region and the pointing position overlap.

When the pointing position is determined to overlap with the selected region, the information processing device 100-2 determines whether a predetermined period of time has elapsed in the state in which the pointing position overlaps with the selected region (Step S408). To be specific, when any part of the selected region is determined to overlap with the pointing position, the control unit 106 determines whether the predetermined period of time has elapsed in the state in which the pointing position overlaps with the selected region. Note that the pointing position may be moved to an extent that the overlapping state with the selected region which has undergone the overlap determination is maintained.

When the predetermined period of time is determined to have elapsed in the state in which the pointing position overlaps with the selected region, the information processing device 100-2 executes the process with respect to the process object corresponding to the selected region (Step S410). To be specific, when the predetermined period of time is determined to have elapsed in the state in which the pointing position overlaps with the selected region, the control unit 106 selects the process object corresponding to the selected region, or executes the process related to the process object.

As described above, according to the second embodiment of the present disclosure, the control unit 106 executes display control corresponding to the pointing position outside the display region. Due to the execution, the user who has understood the correspondence of the pointing position and the display control can intuitively perform the display control, and thus convenience can be improved.

In addition, when the pointing position overlaps with the selected region outside the display region associated with the process object displayed in the display region, the control unit 106 executes the process with respect to the process object. Due to the execution, a region in which the process object can be selected expands outside the display region in which a pointing manipulation is difficult to perform, and thus failure in process object selection or the like can be suppressed.

3-3. Modified Examples

The second embodiment of the present disclosure has been described above. Note that the present embodiment is not limited to the above-described example. Hereinbelow, first and second modified examples of the present embodiment will be described.

First Modified Example

As the first modified example, the information processing device 100-2 may control scrolling of display of a display region according to a pointing position outside the display region. To be specific, the control unit 106 controls scrolling of display of the display region according to overlapping or non-overlapping between a pre-decided region of the display region and the pointing position. Further, details of the process of the present modified example will be described with reference to FIG. 14. FIG. 14 is a diagram illustrating an example of a display change in a scrolling process of the information processing device 100-2 according to the first modified example of the present embodiment.

First, a predetermined region that is outside of the display region adjacent to the display region is set as a process determination region. For example, a region 4 adjacent to the display region 1 is set as a process determination region as illustrated in the upper left drawing of FIG. 14. Note that setting information of the process determination region can be stored in the storage unit 104 or the like.

Then, when the pointing position is detected outside of the display region, the control unit 106 determines whether the pointing position overlaps with the set process determination region. For example, the control unit 106 determines whether the detected pointing position 10 is outside of the display region 1. When the pointing position 10 is moved to the outside of the display region 1 as illustrated in the upper middle drawing of FIG. 14, the pointing position 10 is determined to be outside of the display region 1, and then the control unit 106 determines whether the pointing position 10 overlaps with the process determination region 4.

When the pointing position is determined to overlap with the process determination region, the control unit 106 causes display of the display region to scroll based on a positional relation between the pointing position and the display region. For example, when the pointing position 10 is determined to overlap with the process determination region 4, the control unit 106 scrolls display of the display region 1, for example, a map in the direction of the pointing position 10 with respect to the display region 1, i.e., in the downward direction.

Next, when the pointing position is moved to the outside of the process determination region, the control unit 106 stops scrolling. For example, when the pointing position 10 is moved to a position which is outside of the display region 1 and outside the process determination region 4 as illustrated in the upper right drawing of FIG. 14, or when the pointing position 10 returns to the inside of the display region 1, the control unit 106 stops scrolling of the display of the display region.

As described above, according to the first modified example of the present embodiment, the control unit 106 controls scrolling of display of the display region according to the pointing position outside the display region. Due to the control, because no manipulation object or display object for scrolling manipulations such as a scroll bar is displayed in the display region, scrolling is possible while visibility of display content of the display region is improved.

Inertial Scrolling

Note that, when the pointing position does not stay in the process determination region and is moved from the inside of the display region to the outside of the process determination region, the control unit 106 may perform inertial scrolling on display of the display region. To be specific, when the pointing position is moved from the display region to the outside of the process determination region, the control unit 106 determines execution or non-execution of scrolling based on the speed of the movement. When execution of scrolling is determined, the control unit 106 executes inertial scrolling on display of the display region according to the speed of the movement. Details of the inertial scrolling process will be described with reference to FIG. 14.

First, when the pointing position is moved from the display region to the outside of the process determination region, the control unit 106 computes the speed of the movement. For example, when the pointing position 10 is moved from the inside of the display region 1 to the outside of the process determination region 4 as illustrated in the lower-middle drawing of FIG. 14, the control unit 106 computes the speed of the movement from the start to the end of the movement. Note that the computed speed of the movement may be the speed of the movement at the moment at which it passes over the process determination region.

Next, when the computed speed of the movement is equal to or higher than a threshold value, the control unit 106 causes display of the display region to be subject to inertial scrolling in the direction in which the pointing position is moved. For example, when the computed speed of the movement is equal to or higher than the threshold value, the control unit 106 starts scrolling of the display of the display region. Then, the control unit 106 continues the scrolling for a period of time decided according to the movement distance of the pointing position 10 as illustrated in the lower right drawing of FIG. 14.

In this case, as the scrolling process is executed so as to correspond to the form of the user manipulation, it is possible to give a feeling of convenient manipulation to the user.

Edge Scrolling

In addition, the control unit 106 may scroll display of the display region according to a change in the pointing position in the process determination region. To be specific, when the pointing position is detected in the process determination region and then moved within the process determination region, the control unit 106 scrolls display of the display region according to the movement distance of the pointing position.

For example, when the pointing position is detected within the process determination region, the control unit 106 determines a part of the process determination region that is the pointing position. Next, when the pointing position is moved, the control unit 106 computes the movement distance of the pointing position. Then, the control unit 106 scrolls display of the display region in the direction corresponding to the determined part of the process determination region in a scrolling amount according to the computed movement distance. For example, when a movement of the pointing position is performed in a portion of the process determination region adjacent to a side of the vertical direction of the rectangular display region, the control unit 106 scrolls the display of the display region in the vertical direction.

In this case, as the pointing position outside the display region is scrolled according to the movement amount thereof, the user can intuitively perform the scrolling manipulation outside the display region, and thus convenience can be improved.

Second Modified Example

As a second modified example of the present embodiment, the information processing device 100-2 may cause a manipulation guide object to be displayed on the display region according to the pointing position outside the display region. To be specific, the control unit 106 causes a manipulation guide object to be displayed at a position on the display region adjacent to an edge that is closer to the pointing position than the other edges among the edges of the display region. Details of the process of the present modified example will be described with reference to FIG. 15. FIG. 15 is a diagram illustrating an example in which the manipulation guide object is displayed in the process of the information processing device 100-2 according to the second modified example of the present embodiment.

First, when the pointing position is detected outside of the display region, the control unit 106 determines an edge that is close to the pointing position. For example, when the pointing position 10 is detected outside of the display region 1 as illustrated in FIG. 15, the control unit 106 determines a side of the rectangular display region 1 that is close to the pointing position 10. In FIG. 15, among the short sides of the display region 1, the closer side to the pointing position 10 is determined. Note that the control unit 106 may make the determination when the distance from the pointing position to the display region is equal to or shorter than a threshold value.

Next, the control unit 106 causes the manipulation guide object to be displayed at a position on the display region adjacent to the determined edge. For example, the control unit 106 causes the triangular manipulation guide object 50 whose one side is adjacent to the determined side of the display region 1 to be displayed in the display region 1 as illustrated in FIG. 15. Then, the user moves the pointing position in the direction of the displayed manipulation guide object 50, thereby performing, for example, a flicking manipulation to be described later.

As described above, according to the second modified example of the present embodiment, the control unit 106 causes the manipulation guide object to be displayed at the position on the display region adjacent to the edge closer to the pointing position than the other edge among the edges of the display region. Due to this, the manipulation is guided using the outside of the display region, and thus convenience can be improved.

4. Third Embodiment (Example of a Display Process According to a Manipulation Performed Across a Display Region)

The information processing device 100-2 according to the second embodiment of the present disclosure has been described above. Next, an information processing device 100-3 according to the third embodiment of the present disclosure will be described. The information processing device 100-3 controls display of the display region based on a manipulation across the display region.

4-1. Configuration of an Information Processing Device

The functional configuration of the information processing device 100-3 is substantially the same as those of the first and second embodiments, but the function of the control unit 106 is partially different.

The control unit 106 controls display of the display region based on an operation of moving the pointing position across an edge of the display region (which will also be referred hereinafter to as a crossing operation). To be specific, when the speed of a movement of the pointing position is equal to or higher than a threshold value in the crossing operation, the control unit 106 changes display of the display region regarding the crossing operation as a predetermined manipulation. Details of the process of the present embodiment will be further described with reference to FIG. 16. FIG. 16 is a diagram illustrating an example of the crossing operation of the pointing position in the process of the information processing device 100-3 according to the present embodiment.

First, each time the pointing position is detected, the control unit 106 determines whether the pointing position is outside of the display region, and determines whether the pointing position has been moved across an edge of the display region. For example, when the pointing position 10 is detected as illustrated in the left drawing of FIG. 16, the control unit 106 determines that the pointing position 10 is outside of the display region 1. Then, when the pointing position 10 is moved to the pointing position 10 as illustrated in the right drawing of FIG. 16, the control unit 106 determines that the pointing position 10 is inside of the display region 1. Then, the control unit 106 compares the pointing positions 10 of the past and the present, and thereby determines that the pointing position 10 has been moved from the outside to the inside of the display region 1.

When the pointing position is determined to have been moved across the edge of the display region, the control unit 106 computes the speed of the movement. For example, when the pointing position 10 is determined to have been moved from the outside to the inside of the display region 1, the control unit 106 computes the speed of the movement from the start to the end of the movement. Note that the speed of the movement of the pointing position 10 may be the speed at which it crosses the edge of the display region.

Then, when the computed speed of the movement of the pointing position is equal to or higher than a threshold value, the control unit 106 changes display of the display region. For example, when the computed speed of the movement of the pointing position 10 is equal to or higher than the threshold value, the control unit 106 regards the crossing operation as a predetermined manipulation, for example, a flicking manipulation, and then executes display control related to the flicking manipulation. Note that a process related to the flicking manipulation can be, for example, page scrolling of a content list of a dynamic image application or switching of content being reproduced, a change of a display region or a change of a view point position in a map application, scrolling in a browser, page switching in a book reading application, a display change process of causing a window that is only being partially displayed to be entirely displayed in the Windows system, or the like.

Note that, although the example in which the pointing position is moved from the outside of the display region to the inside of the display region has been described above, the pointing position may be moved from the inside of the display region to the outside of the display region. In addition, a movement of the pointing position may be performed not only in the horizontal direction as described in the example above but also in various directions according to shapes of display regions.

4-2. Process of the Information Processing Device

Next, the process of the information processing device 100-3 according to the present embodiment will be described with reference to FIG. 17. FIG. 17 is a flow chart conceptually showing the process of the information processing device 100-3 according to the present embodiment. Note that description of processes that are the same as those of the first and second embodiments will be omitted.

First, the information processing device 100-3 acquires a pointing position group of a predetermined period of time (Step S502). To be specific, when the pointing position is detected, the control unit 106 acquires information related to a pointing position of the past from the storage unit 104. Note that the information related to the pointing position of the past includes the pointing positions and information representing whether the pointing position is inside or outside of the display regions, and can be a plurality of pieces of information equivalent to, for example, 10 frames, or the like.

Next, the information processing device 100-3 determines whether the crossing operation has been performed (Step S504). To be specific, the control unit 106 determines whether the detected pointing position is inside or outside of the display region, and based on the result of the determination and information representing the inside or the outside of the display region in the acquired information related to the pointing position of the past, determines whether the pointing position has been moved across an edge of the display region.

When the pointing position is determined to have been moved across the edge of the display region, the information processing device 100-3 determines whether the speed of the movement is equal to or higher than a threshold value (Step S506). To be specific, when there is a change between the pointing position related to the determination and the pointing position of the past in terms of whether the pointing position is inside or outside of the display region, the control unit 106 determines that the pointing position has been moved across the edge of the display region. Then, the control unit 106 computes the speed of the movement of the pointing position from the distance between the pointing position of the past and the current pointing position and the time interval related to detection of the pointing position, and determines whether the computed speed of the movement is equal to or higher than the threshold value.

When the speed of the movement of the pointing position is determined to be equal to or higher than the threshold value, the information processing device 100-3 executes display control related to the flicking manipulation (Step S508). To be specific, when the computed speed of the movement of the pointing position is determined to be equal to or higher than the threshold value, the control unit 106 regards the crossing operation as the flicking manipulation, and thus executes the display control related to the flicking manipulation.

As described above, according to the third embodiment of the present disclosure, the control unit 106 controls display of the display region based on the crossing operation in which the pointing position is moved across the edge of the display region. Due to the control, as the crossing of the edge of the display region is used in determination of a manipulation, occurrence of erroneous detection of a manipulation can be suppressed, and user convenience can be improved.

In addition, when the speed of the movement of the pointing position is equal to or higher than the threshold value, the control unit 106 changes display of the display region. Due to the change, erroneous detection of the flicking manipulation caused by a movement of the pointing position near the edge of the display region for which the flicking manipulation is not intended can be prevented, and convenience can be further improved.

4-3. Modified Examples

The third embodiment of the present disclosure has been described above. Note that the present embodiment is not limited to the above-described example. Hereinbelow, first to third modified examples of the present embodiment will be described.

First Modified Example

As the first modified example of the present embodiment, the information processing device 100-3 may control display of the display region according to a direction of the crossing operation. To be specific, the control unit 106 estimates a direction of the crossing operation. Then, the control unit 106 executes display control specified based on the estimated direction of the crossing operation. Details of the process of the present modified example will be described with reference to FIG. 18. FIG. 18 is a diagram illustrating another example of the crossing operation in the process of the information processing device 100-3 according to the first modified example of the present embodiment.

First, the control unit 106 determines whether the crossing operation has been performed. Since the crossing operation determination process is substantially the same as that of the third embodiment, description thereof will be omitted.

When the crossing operation is determined to have been performed, the control unit 106 computes the speed of the movement, and thereby estimates the direction of the movement. For example, when the pointing position is moved as illustrated in the right drawing of FIG. 18, the control unit 106 computes the speed of the movement of the pointing position 10 using the detected pointing position 10 and the pointing position 10 of the past, and thereby estimates the direction of the movement.

Then, when the computed speed of the movement of the pointing position is equal to or higher than the threshold value, the control unit 106 specifies display control associated with the estimated direction of the movement, and then performs the specified display control. For example, when the computed speed of the movement of the pointing position 10 is equal to or higher than the threshold value, the control unit 106 specifies display control associated with the estimated direction of the movement, for example, the vertically downward direction based on association information of the display control and the direction of the movement stored in the storage unit 104. Then, the control unit 106 executes the specified display control on the display region 1. Note that the association information can be stored in the storage unit 104 in advance according to a setting of the user or the like.

As described above, according to the first modified example of the present embodiment, the control unit 106 performs the display control of the display region that is specified based on the direction of the crossing operation. Due to the control, as the number of patterns of display control which can be designated through the crossing operation increases, user convenience can be improved.

Note that, although the example in which the display control to be executed based on a direction of a movement of the pointing position is specified has been described above, display control to be executed based on an edge of the display region through which the pointing position passes during its movement may be specified. For example, when the crossing operation is determined to have been performed, the control unit 106 determines which side among the sides of the display region the pointing position has passed through in the estimated direction of its movement. In addition, the storage unit 104 stores display control associated with each side of the display region. For this reason, the control unit 106 specifies display control that is associated with a side through which the pointing position is determined to have passed from the storage unit 104, and then performs the specified display control. In this case, as the information stored in advance is simplified in comparison to a case in which the direction of a movement is associated with display control, and thus the association information can be easily set.

In addition, although the example in which the display control related to the crossing operation is specified only based on the direction of a movement of the pointing position has been described above, the display control may be specified based on the direction of the movement and whether the pointing position is inside or outside of the display region. For example, information for discriminating a change from the inside to the outside or from the outside to the inside of the display region is added to association information of display control and the direction of a movement, and the control unit 106 specifies display control to be executed based on the direction of the movement and the change of the pointing position between the inside and the outside of the display region. In this case, different display control can be executed when the direction of the movement is the same but the change between the inside and the outside of the display region is different, and thus convenience can be improved by further increasing the number of patterns of display control which can be designated through the crossing operation.

Second Modified Example

As the second modified example of the present embodiment, a plurality of crossing operations may be performed at the same time point. To be specific, the control unit 106 performs display control of the display region that is specified based on the number of crossing operations performed within a predetermined period of time. Details of the process of the present modified example will be further described with reference to FIGS. 19 and 20. FIG. 19 is a diagram illustrating an example of a plurality of crossing operations in the process of the information processing device 100-3 according to the second modified example of the present embodiment, and FIG. 20 is a diagram illustrating another example of the plurality of crossing operations in the process of the information processing device 100-3 according to the second modified example of the present embodiment.

First, the detection unit 102 detects a plurality of pointing positions. For example, the detection unit 102 can detect the pointing positions 10A and 10B as illustrated in the left drawing of FIG. 19 based on operations of the user who performs pointing manipulations related to the detected pointing positions. Note that the pointing manipulations related to the plurality of pointing positions may be performed by a single user or by a plurality of users.

Next, when crossing operations are performed for the plurality of pointing positions, the control unit 106 determines whether the respective crossing operations have been performed at the same time point. For example, when the crossing operations are performed so that the pointing positions 10A and 10B come close to each other in the horizontal direction as illustrated in the right drawing of FIG. 19, the control unit 106 determines that the crossing operations have been performed for the plurality of pointing positions. Then, the control unit 106 determines whether the determination times of the respective crossing operations are within the range of a predetermined time. Note that the predetermined time may be stored in the storage unit 104 in advance, or changed by a user manipulation or the like.

In addition, when the plurality of crossing operations are determined to have been performed at the same time point, the control unit 106 performs display control according to the number of performed crossing operations. For example, when the determination times of the respective crossing operations are determined to be within the range of the predetermined time, the control unit 106 specifies display control according to the number of performed crossing operations from association information of display control stored in advance in the storage unit 104 and the number of crossing operations, and then executes the specified display control, for example, a process related to a pinch-in manipulation.

Note that, when the number of performed crossing operations is the same but the directions of movements of the pointing positions in the crossing operations are different, the control unit 106 may execute different display control. For example, when the pointing positions are moved in a direction in which they are away from each other, the control unit 106 executes a process related to a pinch-out manipulation. In addition, when crossing operations are performed on the plurality of pointing positions in the same vertically downward direction as illustrated in FIG. 20, the control unit 106 may display, for example, a header display such as a manipulation menu in the upper part of the display region. Furthermore, conversely, when crossing operations are performed on the plurality of pointing positions in the same vertically upward direction, the control unit 106 may return, for example, a display of a browser or the like to the top screen. In addition, when a plurality of crossing operations are performed, the control unit 106 may execute enlargement or reduction of a display, switch of a display format, a start or an end of display, or the like.

As described above, according to the second modified example of the present embodiment, the control unit 106 performs the display control of the display region that is specified based on the number of crossing operations performed within the predetermined time. Due to the control, as variations in manipulation patterns increases, user convenience can be further improved.

Third Modified Example

As the third modified example of the present embodiment, when crossing operations are consecutively performed as predetermined manipulations in the same direction, the information processing device 100-3 may determine that the crossing operations that the user does not intend are not predetermined manipulations, for example, flicking manipulations. To be specific, when a second crossing operation is successively performed after a first crossing operation in the direction opposite to the direction of the first crossing operation, the control unit 106 determines whether or not there was a change of a display performed based on the second crossing operation. First, a problem of an information processing device of the related art will be described with reference to FIG. 21. FIG. 21 is a diagram for describing erroneous detection of a flicking manipulation in a process of the information processing device of the related art.

Generally, there are two main types of consecutive flicking manipulations: consecutive flicking manipulations performed in the same direction (hereinafter also referred to as same-direction consecutive flicking manipulations) and consecutive flicking manipulations in which a flicking manipulation performed first and a flicking manipulation performed next are performed in opposite directions (hereinafter also referred to as opposite-direction consecutive flicking manipulations)

Here, since the consecutive flicking manipulations are performed quickly, there are cases in the same-direction consecutive flicking manipulations that a movement of the pointing position for shifting from a flicking manipulation to the next flicking manipulation is recognized as an opposite-direction flicking manipulation. For example, when the pointing position 10 is moved along a trajectory 62 as illustrated in FIG. 21, it is determined that a first right flicking manipulation has been performed. Then, when the pointing position 10 returns along a trajectory 64 for a second right flicking manipulation, it is determined that a left flicking manipulation has been performed, and thus the display of the display region may be changed contrary to an intention of the user.

Thus, in the information processing device 100-3 according to the third modified example of the present embodiment, when a second crossing operation is successively performed after a first crossing operation in the direction opposite to the direction of the first crossing operation, the control unit 106 determines whether or not a process related to the second crossing operation is executed. To be specific, the control unit 106 determines whether or not the process to be performed based on the second crossing operation is executed based on the size of a closed region specified from trajectories of the pointing positions in the first and second crossing operations. Details of the process of the present modified example will be further described with reference to FIGS. 22A and 22B. FIG. 22A is a diagram illustrating an example of the trajectories of the pointing position related to the opposite-direction consecutive flicking manipulations, and FIG. 22B is a diagram illustrating another example of the trajectories of the pointing position in the same-direction consecutive flicking manipulations First, when it is determined that a crossing operation has been performed, the control unit 106 executes the process related to the crossing operation and causes the storage unit 104 to store information representing the pointing position with respect to the crossing operation. For example, when it is determined that the crossing operation has been performed, the control unit 106 causes the storage unit 104 to store information representing each of the pointing positions 10 along the trajectory 62 related to the crossing operation as illustrated in FIGS. 22A and 22B.

Next, when it is determined that the crossing operation has been performed again before a predetermined period of time elapses from the determination of the previous crossing operation, the control unit 106 specifies the closed region that is formed by the trajectories of the pointing positions based on the pointing position related to the crossing operation and the pointing position indicated by the information stored in the storage unit 104. For example, when the crossing operation of the trajectory 62 is performed and then the crossing operation of the trajectory 64 is performed before the predetermined period of time elapses as illustrated in FIGS. 22A and 22B, the control unit 106 specifies the closed region 70 formed by the trajectories 62 and 64.

Here, the specified closed region 70 has different sizes depending on the types of consecutive flicking manipulations. For example, in the opposite-direction consecutive flicking manipulations, the trajectories 62 and 64 are close to each other, and thus the closed region 70A formed by the trajectories 62 and 64 becomes narrow as illustrated in FIG. 22A. On the other hand, in the same-direction consecutive flicking manipulations, the trajectories 62 and 64 are isolated from each other in comparison to the case of the opposite-direction consecutive flicking manipulations, and thus the closed region 70B becomes wide as illustrated in FIG. 22B.

Therefore, based on a comparison between the size of a closed region formed by trajectories of pointing positions related to two crossing operations and a threshold value, the control unit 106 determines whether or not a process related to the crossing operation performed later is executed. In addition, when the size of the closed region is equal to or greater than the threshold value, a series of crossing operations is regarded as the same-direction consecutive flicking manipulation and a crossing operation performed later is not regarded as a flicking manipulation, and thus the control unit 106 does not execute a display change related to the crossing operation performed later.

As described above, according to the third modified example of the present embodiment, when the second crossing operation is successively performed after the first crossing operation in the direction opposite to the direction of the first crossing operation, the control unit 106 determines whether or not display based on the second crossing operation is changed. Due to the determination, as uniform execution of the process related to the crossing operations is prevented, erroneous detection of a flicking manipulation can be suppressed, and thereby user convenience can be improved.

In addition, the control unit 106 determines whether or not the process to be performed based on the second crossing operation is executed based on the size of a closed region specified from trajectories of the pointing positions of the first and second crossing operations. Due to the determination, the accuracy of determination of whether or not the process of the second crossing operation is to be performed, i.e., whether or not the second crossing operation is a flicking manipulation, is improved, and thus user convenience can be further improved.

5. Hardware Configuration Example of the Information Processing Device

The embodiments of the present disclosure have been described above. The processes of the information processing device 100 described above are realized through cooperation of software and the hardware of the information processing device 100 to be described below.

FIG. 23 is an explanatory diagram illustrating a hardware configuration of the information processing device 100 according to an embodiment of the present disclosure. As illustrated in FIG. 23, the information processing device 100 includes a central processing unit (CPU) 132, a read-only memory (ROM) 134, a random access memory (RAM) 136, a bridge 138, a bus 140, an interface 142, an input device 144, an output device 146, a storage device 148, a drive 150, a connection port 152, and a communication device 154.

The CPU 132 functions as an arithmetic processing unit and a control unit and realizes an operation of the detection unit 102 and the control unit 106 in the information processing device 100 in cooperation with various programs. The CPU 132 may be a microprocessor. The ROM 134 stores programs, arithmetic parameters, and the like used by the CPU 132. The RAM 136 temporarily stores programs used in execution of the CPU 132 or parameters or the like properly changed in execution thereof. A part of the storage unit 104 in the information processing device 100 is realized by the ROM 134 and the RAM 136. The CPU 132, the ROM 134, and the RAM 136 are mutually connected by an internal bus configured by a CPU bus or the like.

The input device 144 is configured to include an input unit, such as a mouse, a keyboard, a touch panel, a button, a microphone, a switch, and a lever, used for the user to input information, and an input control circuit which generates an input signal based on an input by the user and outputs the input signal to the CPU 132. The user of the information processing device 100 can input various kinds of data or can give an instruction of a processing operation to the information processing device 100 by manipulating the input device 144.

The output device 146 is an example of the projection unit 108 of the information processing device 100, and outputs information to, for example, a device such as a liquid crystal display (LCD) device, an organic light emitting diode (OLED) device, or a lamp. The output device 146 may output an audio of a speaker, a headphone, and the like.

The storage device 148 is a device that stores data. The storage device 148 may include a storage medium, a recording device recording data on a storage medium, a reading device reading data from a storage medium, or a deletion device deleting data recorded on a storage medium. The storage device 148 stores programs executed by the CPU 132 or various kinds of data.

The drive 150 is a reader-writer for storage media, and mounted in the information processing device 100 or attached to the outside. The drive 150 reads information stored in a removable storage medium such as a loaded magnetic disk, optical disc, or magneto-optical disc, or a semiconductor memory, and outputs the information to the RAM 134, in addition, the drive 150 can also write information on the removable storage medium.

The connection port 152 is, for example, a bus connected to an external information processing process or a peripheral device of the information processing device 100. The connection port 152 may be a Universal Serial Bus (USB).

The communication device 154 is, for example, a communication interface configured by a communication device connected to a network. The communication device 154 may be a device corresponding to infrared communication, may be a communication device corresponding to a wireless local area network (LAN), may be a communication device corresponding to Long Term Evolution (LTE), or may be a wired communication device performing communication in a wired manner.

6. Conclusion

As described above, according to the first embodiment of the present disclosure, as a display object for a pointing manipulation may not be displayed in a display region, display of the display region can be controlled according to a user manipulation while improving visibility of display content of the display region. In addition, according to the second embodiment of the present disclosure, a user who understands a correspondence of a pointing position and display control can intuitively perform the display control, and thus convenience can be improved. In addition, according to the third embodiment of the present disclosure, due to such a correspondence, as crossing of an edge of the display region can be used in determination of a manipulation, occurrence of erroneous detection of a manipulation can be suppressed, and user convenience can be improved.

It should be understood by those skilled in the art that various modifications, combinations, sub-combinations and alterations may occur depending on design requirements and other factors insofar as they are within the scope of the appended claims or the equivalents thereof.

For example, although examples in which the pointing position is obviously outside of the display region have been described in the above embodiments, when the pointing position is near an edge of the display region, the information processing device 100 may indicate to the user that the pointing position is not outside of the display region. For example, when the control unit 106 determines whether the pointing position is within a predetermined distance from an edge of the display region or in a predetermined region that is near the edge and the pointing position is determined to be within the predetermined distance or in the region, the control unit performs predetermined display control. The predetermined display control can be emitting light from the edge or a part of the edge of the display region, changing display of a manipulation object, displaying the manipulation object on the inner side of the display region rather than the pointing position, a combination of these, or the like.

In a state in which the pointing position is near the edge of the display region, it is generally difficult for the user to recognize whether or not the pointing position is outside of the display region. However, causing the user to be aware that the pointing position is not outside of the display region through the above processes will promote a correction manipulation, and thus user convenience can be improved.

In addition, when the pointing position is outside of the display region, the information processing device 100 may perform display control indicating that the pointing position is outside of the display region. For example, when the pointing position is determined to be outside of the display region, the control unit 106 may cause a periphery of the edge of the display region to emit light, change a color, shape, or pattern of the manipulation object, or output sound or vibration from a separate audio output unit or vibration output unit of the information processing device 100.

In addition, although the example in which display of the manipulation object or the process object is controlled separately has been described in the first embodiment and the modified example described above, display of both the manipulation object and the process object may be controlled.

In addition, a background of display in the display region may be changed according to a distance or a direction from the pointing position to the display region. For example, when display control related to light emission in which the pointing position serves as a light emitting source is performed and the pointing position approaches the display region, the control unit 106 can cause a position of the display region that is closer to the pointing position than other positions to emit light more intensely than the other positions. In this case, the user can understand the pointing position more intuitively, and thus manipulation performance of a manipulation using the outside of the display region can be improved.

In addition, although examples in which the display region is rectangular have been described in the above-described embodiments, the display region may have any of various other shapes such as polygonal, circular, or oval shape.

In addition, although examples in which the information processing device 100 is a device having the projection unit 108 have been described in the above-described embodiments, the information processing device 100 may be an information processing device connected to a separate-bodied projection device. For example, the information processing device 100 may be a server having the detection unit 102, a storage unit 104, and the control unit 106, and installed in a remote place from the imaging device 200 and the separate-bodied projection device.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:

an acquisition unit configured to acquire manipulation position information representing a manipulation position that is specified based on a manipulation for pointing to an outside of a display region that is a region in which a display object is displayable or an outside of a partial region of the display region associated with a user using a manipulating body at a position distant from the display region; and a control unit configured to control display of the display region based on the manipulation position information acquired by the acquisition unit.

(2)

The information processing device according to (1), wherein the control unit controls display of the display region based on a positional relation between the manipulation position that is outside of the display region and the display region.

(3)

The information processing device according to (2), wherein the control unit controls display of the display region according to a distance from the manipulation position that is outside of the display region to the display region.

(4)

The information processing device according to (3), wherein display of the display region includes a manipulation object displayed at a position of the display region specified based on the manipulation position, and wherein the control unit controls display of the manipulation object according to the distance.

(5)

The information processing device according to (3) or (4), wherein display of the display region includes a process object related to execution of a process to be displayed in the display region, and wherein the control unit controls display of the process object according to the distance.

(6)

The information processing device according to (2), wherein the control unit executes display control corresponding to the manipulation position that is outside of, the display region.

(7)

The information processing device according to (6), wherein, when a selected region that is outside of the display region associated with a process object displayed in the display region overlaps with the manipulation position, the control unit executes a process with respect to the process object.

(8)

The information processing device according to (6) or (7), wherein the control unit controls scrolling of display of the display region according to the manipulation position that is outside of the display region.

(9)

The information processing device according to any one of (6) to (8), wherein the control unit causes a manipulation guide object to be displayed at a position in the display region adjacent to an edge that is closer to the manipulation position than other edges among edges of the display region.

(10)

The information processing device according to (2), wherein the control unit controls display of the display region based on a crossing operation in which the manipulation position is moved across an edge of the display region.

(11)

The information processing device according to (10), wherein, when a speed of movement of the manipulation position is equal to or higher than a threshold value, the control unit changes display of the display region.

(12)

The information processing device according to (11), wherein, when a second crossing operation is successively performed after a first crossing operation in a direction opposite to a direction of the first crossing operation, the control unit determines whether or not display is changed based on the second crossing operation.

(13)

The information processing device according to (12), wherein the control unit performs the determination based on a size of a closed region specified from trajectories of the manipulation position in the first crossing operation and the second crossing operation.

(14)

The information processing device according to any one of (10) to (13), wherein the control unit performs display control of the display region specified based on a direction of the crossing operation.

(15)

The information processing device according to any one of (10) to (14), wherein the control unit performs display control of the display region specified based on a number of the crossing operations performed in a predetermined period of time.

(16)

The information processing device according to any one of (1) to (15), wherein the control unit halts display control when the manipulation position is moved out of a predetermined range that is adjacent to the display region and outside the display region.

(17)

The information processing device according to (1), wherein the region associated with the user includes a manipulation region that is displayed in the display region and associated with the user.

(18)

An information processing method including:

acquiring manipulation position information representing a manipulation position that is specified based on a manipulation for pointing to an outside of a display region that is a region in which a display object is displayable or an outside of a partial region of the display region associated with a user using a manipulating body at a position distant from the display region; and controlling display of the display region based on the acquired manipulation position information.

(19)

A program causing a computer to realize:

an acquisition function of acquiring manipulation position information representing a manipulation position that is specified based on a manipulation for pointing to an outside of a display region that is a region in which a display object is displayable or an outside of a partial region of the display region associated with a user using a manipulating body at a position distant from the display region; and a control function of controlling display of the display region based on the manipulation position information acquired through the acquisition function.

(20)

An information processing apparatus comprising:

circuitry configured to execute a process related to displayed content located inside of a boundary of a display region, based on a detection result of detecting that a pointing position is moved between a location inside of the boundary of the display region and a location outside of the boundary of the display region, wherein the pointing position is determined based on a location of a target whose position is indicated by a trajectory of a pointing operation made by a user.

(21)

The information processing apparatus according to (20), wherein when the pointing position is detected to have moved from the location inside of the boundary of the display region to the location outside of the boundary of the display region, the process related to the displayed content is executed.

(22)

The information processing apparatus according to (20) or (21), wherein when the pointing position is detected to have moved from the location outside of the boundary of the display region to the location inside of the boundary of the display region, the process related to the displayed content is executed.

(23)

The information processing apparatus according to any one of (20) to (22), wherein when the pointing position is detected to have moved from the location inside of the boundary of the display region to the location outside of the boundary of the display region, a first process related to the displayed content is executed as the process, and when the pointing position is detected to have moved from the location outside of the boundary of the display region to the location inside of the boundary of the display region, a second process related to the displayed content is executed as the process, and wherein the first process and the second process are different processes.

(24)

The information processing apparatus according to (20) to (23), wherein the executed process comprises a changing of the displayed content.

(25)

The information processing apparatus according to (24), wherein the executed process is a scroll function.

(26)

The information processing apparatus according to (24), wherein the executed process is a page changing function.

(27)

The information processing apparatus according (24), wherein the executed process is an advance forward or an advance backward function.

(28)

The information processing apparatus according to any one of (20) to (27), wherein the pointing position is located at an intersection of the trajectory of the pointing operation and a plane that corresponds to the display region.

(29)

The information processing apparatus according to any one of (20) to (28), wherein the pointing position is located along the trajectory of the pointing operation within a plane that corresponds to the display region.

(30)

The information processing apparatus according to any one of (20) to (29), wherein the process is executed based on a detection result of detecting that a plurality of pointing positions are respectively moved between respective locations inside of the boundary of the display region and respective locations outside of the boundary of the display region.

(31)

The information processing apparatus according to any one of (20) to (30), wherein the trajectory of the pointing operation corresponds to a line of sight of the user.

(32)

The information processing apparatus according to any one of (20) to (31), wherein the pointing operation is made by the user from a location that is remote from the location of the target.

(33)

The information processing apparatus according to any one of (20) to (32), wherein the pointing operation does not touch or come into proximity to the display region.

(34)

The information processing apparatus according to any one of (20) to (33), wherein location of the pointing position changes in correspondence with a changing of the trajectory of the pointing operation.

(35)

The information processing apparatus according to any one of (20) to (34), wherein an icon is displayed at the pointing position when the pointing position is located inside of the boundary of the display region.

(36)

The information processing apparatus according to any one of (20) to (35), wherein the pointing operation is made for manipulation of a display object that is displayed inside of the boundary of the display region.

(37)

The information processing apparatus according to any one of (20) to (36), wherein when the pointing position is located outside of the boundary of the display region, the circuitry is further configured to initiate a providing of an indicator to indicate to the user that the pointing position is located outside of the boundary of the display region.

(38)

The information processing apparatus according to any one of (20) to (37), wherein the indicator is a visual notification.

(39)

The information processing apparatus according to any one of (20) to (38), wherein when the pointing position is located outside of the boundary of the display region, the circuitry is further configured to initiate a providing of an indicator to indicate to the user a distance between the pointing position and the boundary of the display region.

(40)

The information processing apparatus according to any one of (20) to (39), wherein the circuitry executes the process based further on a voice input.

(41)

An information processing method comprising:

detecting that a pointing position is moved between a location inside of a boundary of a display region and a location outside of the boundary of the display region; and executing, based on a detection result of the detecting, a process related to displayed content located inside of the boundary of the display region, wherein the pointing position is determined based on a location of a target whose position is indicated by a trajectory of a pointing operation made by a user.

(42)

A non-transitory computer-readable medium having embodied thereon a program, which when executed by a computer causes the computer to execute an information processing method, the method comprising:

detecting that a pointing position is moved between a location inside of a boundary of a display region and a location outside of the boundary of the display region; and executing, based on a detection result of the detecting, a process related to displayed content located inside of the boundary of the display region, wherein the pointing position is determined based on a location of a target whose position is indicated by a trajectory of a pointing operation made by a user.

REFERENCE SIGNS LIST 1 display region
10 pointing position
20 icon
30 cursor
100 information processing device
102 detection unit
104 storage unit
106 control unit
108 projection unit
200 imaging device

The invention claimed is:

1. An information processing apparatus comprising:
   a control unit configured to
      control, when a pointing position is located inside of a boundary of a display region in which an indicator is displayable by a display device, a displaying of the indicator in the display region, by the display device, to indicate to a user the pointing position, the pointing position being determined based on a trajectory of a pointing operation made by the user,
      execute a process related to displayed content located inside of the boundary of the display region, based on a detection result of detecting that the pointing position is moved between a location inside of the boundary of the display region and a location outside of the boundary of the display region, and
      control, when the pointing position is moved in a direction in which the pointing position is separated from the display region outside of the boundary of the display region, a distorting of the indicator, displayed by the display device, in a direction from the indicator to the pointing position,
   wherein the control unit is implemented via at least one processor.

2. The information processing apparatus of claim 1, wherein when the pointing position is detected to have moved from the location inside of the boundary of the display region to the location outside of the boundary of the display region, the process related to the displayed content is executed.

3. The information processing apparatus of claim 1, wherein when the pointing position is detected to have moved from the location outside of the boundary of the display region to the location inside of the boundary of the display region, the process related to the displayed content is executed.

4. The information processing apparatus of claim 1,
   wherein when the pointing position is detected to have moved from the location inside of the boundary of the display region to the location outside of the boundary of the display region, a first process related to the displayed content is executed as the process,
   wherein when the pointing position is detected to have moved from the location outside of the boundary of the display region to the location inside of the boundary of the display region, a second process related to the displayed content is executed as the process, and
   wherein the first process and the second process are different processes.

5. The information processing apparatus of claim 1, wherein the executed process comprises a changing of the displayed content.

6. The information processing apparatus of claim 5, wherein the executed process is a scroll function.

7. The information processing apparatus of claim 5, wherein the executed process is a page changing function.

8. The information processing apparatus of claim 5, wherein the executed process is an advance forward or an advance backward function.

9. The information processing apparatus of claim 1, wherein the pointing position is located at an intersection of the trajectory of the pointing operation and a plane that corresponds to the display region.

10. The information processing apparatus of claim 1, wherein the pointing position is located along the trajectory of the pointing operation within a plane that corresponds to the display region.

11. The information processing apparatus of claim 1, further comprising:
a detection unit configured to detect that another pointing position is moved between another location inside of the boundary of the display region and another location outside of the boundary of the display region,
wherein the process is executed based further on another detection result of detecting that the another pointing position is moved between the another location inside of the boundary of the display region and the another location outside of the boundary of the display region, and
wherein the detection unit is configured via at least one processor.

12. The information processing apparatus of claim 1, wherein the trajectory of the pointing operation corresponds to a line of sight of the user.

13. The information processing apparatus of claim 1, wherein the pointing operation does not touch or come into proximity to the display region.

14. The information processing apparatus of claim 1, wherein a location of the pointing position changes in correspondence with a changing of the trajectory of the pointing operation.

15. The information processing apparatus of claim 1, wherein an icon is displayed at the pointing position when the pointing position is located inside of the boundary of the display region.

16. The information processing apparatus of claim 1, wherein the pointing operation is made for manipulation of a display object that is displayed inside of the boundary of the display region.

17. The information processing apparatus of claim 1, wherein when the pointing position is located outside of the boundary of the display region, the control unit is further configured to control a providing of the indicator to indicate to the user that the pointing position is located outside of the boundary of the display region.

18. The information processing apparatus of claim 17, wherein the indicator is a visual notification.

19. The information processing apparatus of claim 1, wherein the process related to the displayed content located inside of the boundary of the display region is executed based further on a speed of movement of the pointing position between the location inside of the boundary of the display region and the location outside of the boundary of the display region being equal to or higher than a threshold value for a flicking manipulation.

20. The information processing apparatus of claim 1, wherein the distorting of the indicator, displayed by the display device, in the direction from the indicator to the pointing position includes distorting the indicator according to a distance between the pointing position and the boundary of the display region.

21. The information processing apparatus of claim 1, wherein, when the pointing position is located outside of the boundary of the display region, an entirety of the indicator is displayed by the display device.

22. The information processing apparatus of claim 1, wherein, after the pointing position is located outside of the boundary of the display region, the indicator is displayed, by the display device, at a location that the pointing position is detected to have moved between the location inside of the boundary of the display region and the location outside of the boundary of the display region.

23. An information processing method comprising:
displaying, by a display device, when a pointing position is located inside of a boundary of a display region in which an indicator is displayable by the display device, the indicator in the display region to indicate to a user the pointing position, the pointing position being determined based on a trajectory of a pointing operation made by the user;
executing, based on a detection result of detecting that the pointing position is moved between a location inside of the boundary of the display region and a location outside of the boundary of the display region, a process related to displayed content located inside of the boundary of the display region; and
distorting, when the pointing position is moved in a direction in which the pointing position is separated from the display region outside of the boundary of the display region, the indicator, displayed by the display device, in a direction from the indicator to the pointing position.

24. A non-transitory computer-readable medium having embodied thereon a program, which when executed by a computer causes the computer to execute an information processing method, the method comprising:
displaying, by a display device, when a pointing position is located inside of a boundary of a display region in which an indicator is displayable by the display device, the indicator in the display region to indicate to a user the pointing position, the pointing position being determined based on a trajectory of a pointing operation made by the user;
executing, based on a detection result of detecting that the pointing position is moved between a location inside of the boundary of the display region and a location outside of the boundary of the display region, a process related to displayed content located inside of the boundary of the display region; and
distorting, when the pointing position is moved in a direction in which the pointing position is separated from the display region outside of the boundary of the display region, the indicator, displayed by the display device, in a direction from the indicator to the pointing position.

* * * * *